May 30, 1967 A. P. MULLERY ETAL 3,323,108

SYMBOLIC ADDRESSING

Filed June 12, 1963 7 Sheets-Sheet 1

INVENTORS
ALVIN P. MULLERY
RALPH F. SCHAUER
BY [signature]
ATTORNEY

May 30, 1967 A. P. MULLERY ETAL 3,323,108

SYMBOLIC ADDRESSING

Filed June 12, 1963 7 Sheets-Sheet 3

SYMBOLIC ADDRESSING

Filed June 12, 1963 7 Sheets-Sheet 7

United States Patent Office 3,323,108

Patented May 30, 1967

3,323,108

SYMBOLIC ADDRESSING

Alvin P. Mullery, Chappaqua, and Ralph F. Schauer, Hawthorne, N.Y., assignors to International Business Machines Corporation, New York, N.Y., a corporation of New York Filed June 12, 1963, Ser. No. 287,364

26 Claims. (Cl. 340—172.5)

The present invention relates to a system for determining the absolute address of a string of data in a large high speed random access memory using only the symbolic designation of said data string. More particularly, it relates to such a data system wherein all strings of data are provided with a symbolic designation, which designation is subsequently utilized in search procedures together with linking addresses stored therein to determine the absolute address in memory of the data string.

It is obvious that most conventional data handling systems as used in present day electronic computers would be greatly enhanced if the programmer or machine operator were not required to provide the absolute addresses of the data to be read out of the Main Memory and operated on in accordance with the program. In current machines, the programmer either supplies this address directly or the machine, through an involved set of bookkeeping subroutines, must specifically keep track of the addresses of all data stored in the machine for subsequent read out and use.

It has now been found that data addressing may be greatly simplified by providing a fixed section of memory associated with each data string, which it is desired to access, for the purpose of storing a recognizable Name or symbol which designates each string of data separately from other strings.

Further, storage room is allocated adjacent to this Name for allowing storage of the address of another such symbol or Name which is closely related to the first. By means of this subsequent address provision together with the Name of data associated with each data string, a symbol or Name loop is formed in memory wherein a first level of entry is made into the symbolic addressing search mechanism based on a first broad parameter and subsequent specific searching and comparison are done within the Name loop in accordance with the specific details of the symbol being sought. Thus, for example, if a four binary bit symbol code were used, the search would be initiated, for example, in any one of four Name loops based on the first two postions of the four bit code, i.e., 1, 1; 0, 0; 1, 0; and 0, 1, which would establish a given Name or symbolic loop in which the search is to be made for a match with the remaining two positions of the four bit Name code.

A symbolic addressing scheme of this type, while clearly not possessing the speed of a fully associative memory possessing tag bits, is far faster than a conventional search progressing serially through a large random access memory. The system provided is thus much more advantageous for a programmer in that it is only necessary to symbolically name the data string which he desires rather than give the absolute address. Further, it is far faster than a serial search scheme which the programmer would otherwise have to initiate to find a given portion of data if the symbol or Name of the string were all that were available and the string could be stored at any location within the memory.

In such latter case, a serial search and comparison of all of the data stored in the system might be required before the absolute address of that data could be obtained.

It is accordingly a primary object of the present invention to provide a symbolic addressing system for use with high speed random access memories.

It is a further object to provide such a system wherein the absolute address of a data string may be automatically and quickly derived by merely denoting the symbolic Name of said data.

It is another object to provide such a system wherein the address is determined through use of a plurality of symbolic Name lists.

It is a further object to automatically select a certain symbolic list in accordance with certain characteirstics of a specified instruction symbol.

It is a still further object to provide means for closing the symbolic lists to form searching loops.

It is yet another object to provide an indication when a search of the entire loop has been accomplished.

It is another object to provide such a system wherein means are provided in said loop for indicating when no such data as called for in the symbolic address is present in the loop.

It is another object to provide such a system wherein means are provided for automatically entering the loop for a search sequence at the position in said loop where a last successful search occurred.

The foregoing and other objects, features and advantages of the invention will be apparent from the following more particular description of a preferred embodiment of the invention, as illustrated in the accompanying drawings.

Figure 1:
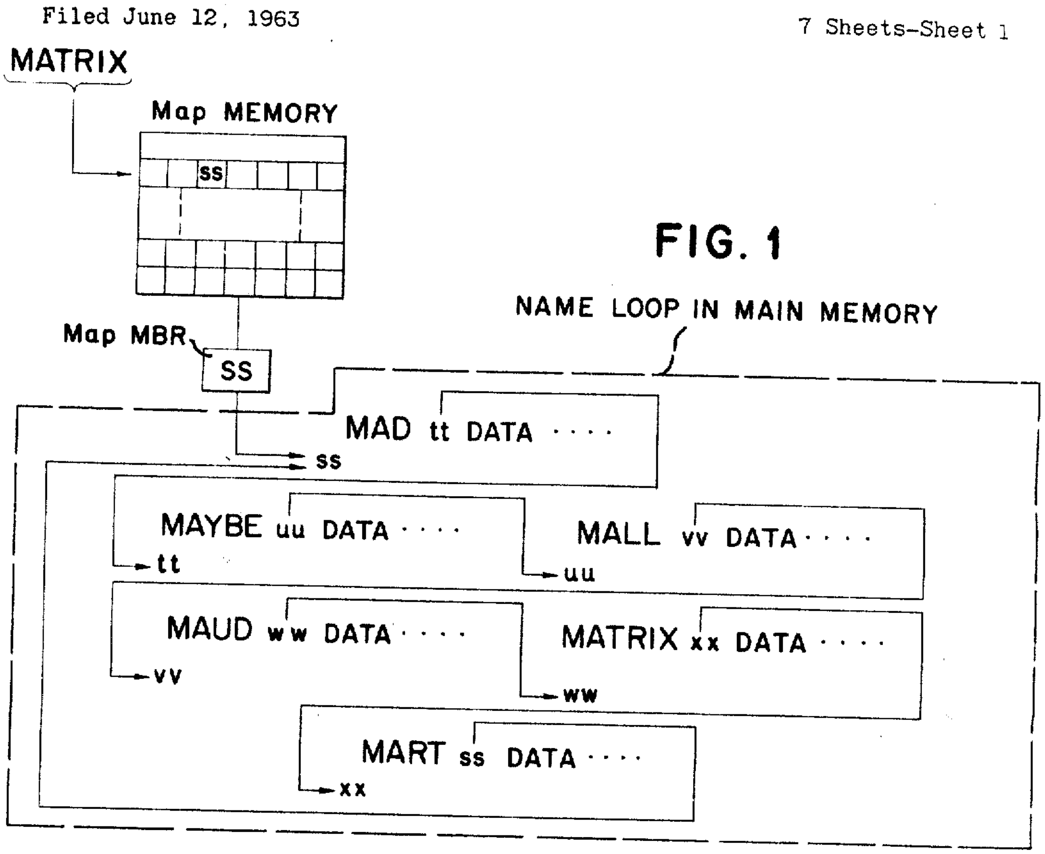
FIGURE 1 is a schematic representation of certain of the hardware necessary to implement such a system together with a diagrammatic representation of the manner in which a symbolic Name loop according to one aspect of the invention is embodied.

FIGURES *4a* through *4e* comprise a detailed logical schematic diagram of an operative embodiment of the present invention illustrating the necessary control circuitry and major functional components.

The objects of the present invention are accomplished in general by a method of and apparatus for symbolically addressing a data storage system having storage locations therein for a plurality of data strings, each such storage location being directly addressable by the storage system. A small segment of each storage location is made available in said memory at a predetermined location with respect to the beginning of each of said data strings for storing a symbolic designation of the associated data string. Means are further provided for forming an addressable loop comprising certain of said symbols based on a predetermined common relationship existing between same and further storage locations are provided in each data string for storing the link address of the next member of said loop of which said data string is a member. Means are provided for addressing one member of each loop based upon the common loop characteristic and for automatically continuing a search within said loop, utilizing the link address stored with sequential members of the loop and means are further provided for comparing each symbol with an instruction symbol.

In the above system, the means for initially entering a given symbol loop comprises a special Map memory containing the addresses of one member of each of the various symbol loops. This memory is addressed by taking two characters of an instruction symbol, deriving an address therefrom and entering the Map memory in accordance therewith. The particular address in the Map memory gives the address in the main storage means or memory of one member of the appropriate symbol loop and thus provides an entry point into the loop. This member is read from memory and the symbol stored therein compared with the symbol in an instruction. If the first comparison fails, the next member of the loop is accessed until a successful comparison is made or it is determined that there is no match present in the loop. In the latter event, depending on the search instruction, the new symbol will be inserted in the loop or an "error" or "not present" signal will be produced.

It will thus be seen from the above general statements of the invention that the instant system provides an extremely simple addressing scheme for a symbolically organized memory. By use of the system, the only address instruction required is the characteristic symbol stored with each piece of data or data string which identifies that particular data string. According to the system to be more fully set forth and described subsequently, the absolute address in memory for the desired data string is automatically determined and controls are set for reading the desired data from the main storage or memory.

As stated previously, the present system accomplishes the programming advantages of an associative memory with only a fraction of the circuitry required of an associative memory. The only requirement the present invention makes on the data stored in the system is that each string of data be provided at some significant fixed location with respect to the string with a symbol characeristic of the data stored therewith. In addition, a storage location must be provided, again with fixed relationship to the symbol contained in such data string for storing a main memory address to be used for linking members of the loop. In a 128 x 128 word organized memory containing 16,384 words, a fourteen bit address, of which seven bits are the X address and seven bits are the Y address, is required to address any particular word within said memory as is well known in the art. In the embodiment disclosed and described herein, it will be assumed that the symbol designation for each data string is stored at the beginning of said data string and that the address of a successive member of said loop will be stored at a fixed location with respect to this symbol, i.e., in the data storage location immediately succeeding that allocated for storing the Name of the data string.

The significant data address symbol will be referred to as a "Name" thoughout the remainder of the specification. However, it is to be understood that any convenient group of binary characters may be used to define such a symbol. The only requirement is that they be different for each portion of data, i.e., a long machine word in the present embodiment and that each member of a data loop or list have a common portion or number of characters.

Figure 2:
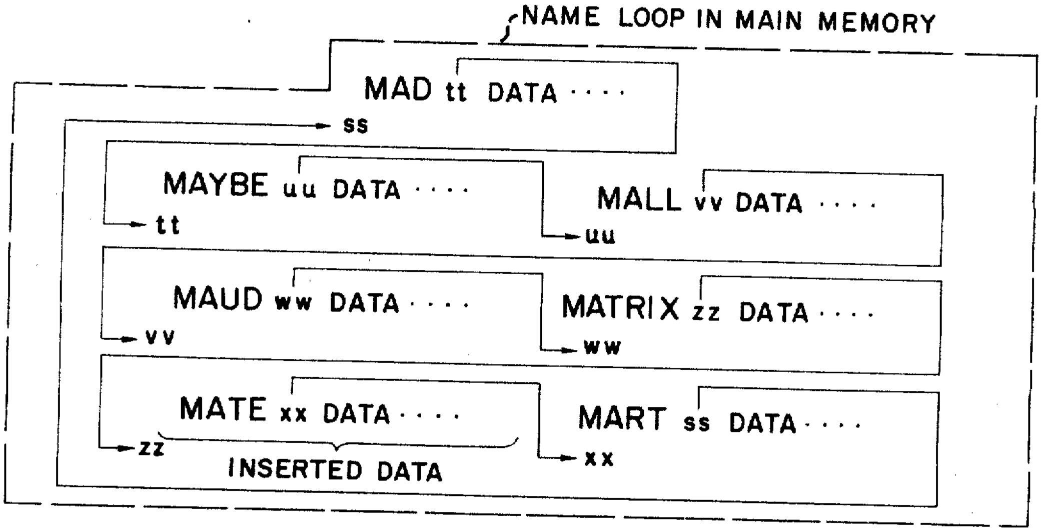
FIGURE 2 is a schematic representation of the symbolic Name loop of FIGURE 1 illustrating a data insert procedure into said loop.

The following general description of the present symbolic addressing concept with reference to the diagrams of FIGURES 1 and 2 will serve to explain the system organization insofar as the manner in which data loops are formed in the system and how the loop linking addresses are stored with each symbol in a data string to accomplish the loop formations.

In the embodiment of the particular Name loop shown in FIGURES 1 and 2, the Names, MAD, MAYBE, MALL, MAUD, MATRIX, MATE and MART are used. Each of these Names has the first two characters M and A in common. Thus, as data strings are input into the data storage system having the above Names illustrated in FIGURE 1, the data string named MAD will first be stored. As MAYBE, MALL, MAUD, MATRIX and MART are input into the system, not necessarily in sequential order, the address of the storage location for MAYBE will be placed in the special loop linking address storage location of the data string named MAD. The same procedure will occur when MALL is input into the system. Its address will be stored in the special loop linking address location for the data string MAYBE. Thus, a linked Name list will be formed in the main information storage system or memory wherein each member of the Name loop is linked together by the address locations. The apparatus for inputing this data as well as affording a search of this loop will be set forth more fully subsequently, together with means for automatically linking the last member of the loop, i.e., MART in the above example, with the first member, i.e., MAD.

Referring now specifically to FIGURE 1, assuming that the Name loop described above has been stored in memory with the data string named MAD, stored at location *ss* as denoted by the letters *ss* appearing under the M of the Name for the MAD data string. The letters *tt* located directly in the data string after the Name designate the fourteen bit linking address for the next member of this particular Name loop, i.e., MAYBE, which is stored at location *tt* in the Main Memory. The letters, i.e., *tt*, appearing under each Name in the figures denote a storage location whose address is *tt*. In others, this latter occurrence of the letters does not form any portion of stored data; but, indicate an actual storage location. The remainder of the loop is connected together in the same manner, it being noted that the last member, i.e., MART, contains the linking address *ss* which closes the loop and again returns the search to the first member, i.e., MAD.

This loop will be designated at the MA Name loop since all of the Names have the common characteristic of the first two characters being an M and an A. Assume that an instruction is received by the system to find the location of the data string named MATRIX. Means must be provided for automatically entering the proper Name loop for this particular Name. Since as indicated, the first two letters or MA are the common characteristic of the loop, it will be assumed for purposes of the remainder of the specification that the first two letters of any Name are the significant or determinative characters which specify the particular loop in which a named data string is to be stored or searched. According to the teaching of the present invention, a special Map memory designated in block form in FIGURE 1 is utilized to store an address of one member of every named loop to be encountered in the data storage system. This Map memory is addressed by an address determined from the significant characters, i.e., MA of the symbols included in the loop. For example, assuming only the twenty-six alphabetic symbols, there are six hundred fifty possible combinations of these twenty-six symbols taken in both combinations and permutations of any two thereof. Thus, for the loop identification symbols MA, an address in the Map memory is determined by a decoder (not shown) of a type well known in the art which addresses the Map memory at the locations where the address of one member of the MA loop is stored.

As indicated in FIGURE 1, the address stored at location MA of the Map memory is the X–Y address in Main Memory designated by the term *ss*. This address is "read out" of the Map memory and supplied to the Main Memory Address Register which accesses the position *ss* and reads out the Name MAD together with its associated data. According to the present invention, a comparison would be made of this Name, i.e., MAD, with the Name occurring in the system instruction, i.e., MATRIX. Since the Names do not compare, the next Name of the loop will be accessed. As will be seen in the figure, the address *tt* is the address of the next member of the MA Name loop. The system automatically accesses the data at the address *tt*, thus reading out the data named MAYBE. Again, this comparison fails and the Names in the loop are read out of Main Memory sequentially compared and the next Name accessed in the manner outlined above until finally, the data string named MATRIX is read out of Main Memory and a favorable compare is obtained. If the instruction to the system was a "write" instruction wherein the data string named MATRIX is to be replaced with new data, the new data will automatically be read into this particular address position by the memory control circuitry while maintaining the old link address *xx* for the new data. If a "read" instruction were given to the system, the data string named MATRIX would be read out on appropriate lines from the Main Memory Buffer Register.

An important additional aspect of the present system is illustrated in FIGURE 1, as mentioned previously, in that the linking address *ss* is included in the linking address storage location for the last member of the loop, i.e., MART, thus, closing the Name loop. This aspect is important from another standpoint in that when a successful comparison in a given Name loop is made, the address of that data string is automatically read back into the Map memory for that particular Name loop so that the entry point into any given Name loop in this system will be current, i.e., an entry and search will always begin at the point where the last member of the loop was read out. This is of some importance in terms of the efficiency of machine operation since as a general statistical rule, when data is read from a computer memory, the operations performed are generally in sequence whether alphabetical, numerical or otherwise. Therefore, when a next piece of data is to be accessed in a long chain or string of data, in all likelihood the piece of data subsequent to the last used piece of data is the one that will be accessed next. Therefore, as in the instant case, where data must be read out and examined sequentially, considerable time will be saved if the entry point for a given search being at the last entered or successful accessed piece of data in a list of many such pieces or strings.

It will, of course, also be obvious that with the use of such a current addressing scheme with a Name loop of the present type, it is necessary that the loop be closed at the ends, otherwise if a search were begun at the Name MATRIX in the above example, the search could only continue through the last member, i.e., MART before the end of the chain were reached and it would not be possible to ever begin again at the beginning of said chain unless as a matter of course all searches in a given Name loop were started at the beginning of the Name list which for the reasons set forth above is often undesirable.

FIGURE 2 illustrates the manner in which a named data string is inserted into an existing data loop. In this example, the string of data named MATE is to be inserted after the last located piece of data, i.e., MATRIX, from the previous example. FIGURE 2 merely shows the results of such an insertion in terms of the addresses that are stored in the new member of the loop as well as the addresses which were modified in existing members. It will be noticed that the linking address in the member of the loop name MATRIX or *xx* has been removed and the address of the data named MATE or *zz* inserted therein. The data named MATE is, of course, stored at position *zz* in the Main Memory as indicated and the linking address *xx* which was formerly associated with the data named MATRIX has been stored in the linking address location of the new member of the loop MATE.

It should be noted that a particular member or named piece of data of a loop may be deleted in substantially the same manner although a specific example has not been shown in the drawings since the manner of such deletion would be obvious. For example, in the string of FIGURE 1, if it were desired to delete the data named MALL, the linking address *uu* would be removed from the data string named MAYBE and the linking address *vv* formerly associated with the data string named MALL inserted therein. Therefore, the loop would be modified so that in a search of said loop, the search would proceed directly from the data string named MAYBE to the data string named MAUD, thus, bypassing the deleted member of the loop as though it never existed.

It will be apparent that assuming the actual data is named as set forth in the previous discussion and has available storage locations therein for Name loop linking addresses, the insertion or search of data within such a named loop requires two operating sequences. The first sequence is the entry of a particular loop by utilizing the common significant characters of the particular data symbol or name, i.e., the letters MA in the examples. Secondly, having gained access to this loop, the specific members must be serially accessed and a full comparison with the instruction Name made with the Name contained at the various locations of the loop.

As indicated in the above discussion, any system which utilizes the above symbolic addressing concept must have apparatus means for first effecting the storage and arrangement of the data in Main Memory and secondly, be able to use this arrangement in the manner set forth, i.e., to perform an effective symbolic search and address of data stored in memory.

Figure 3:
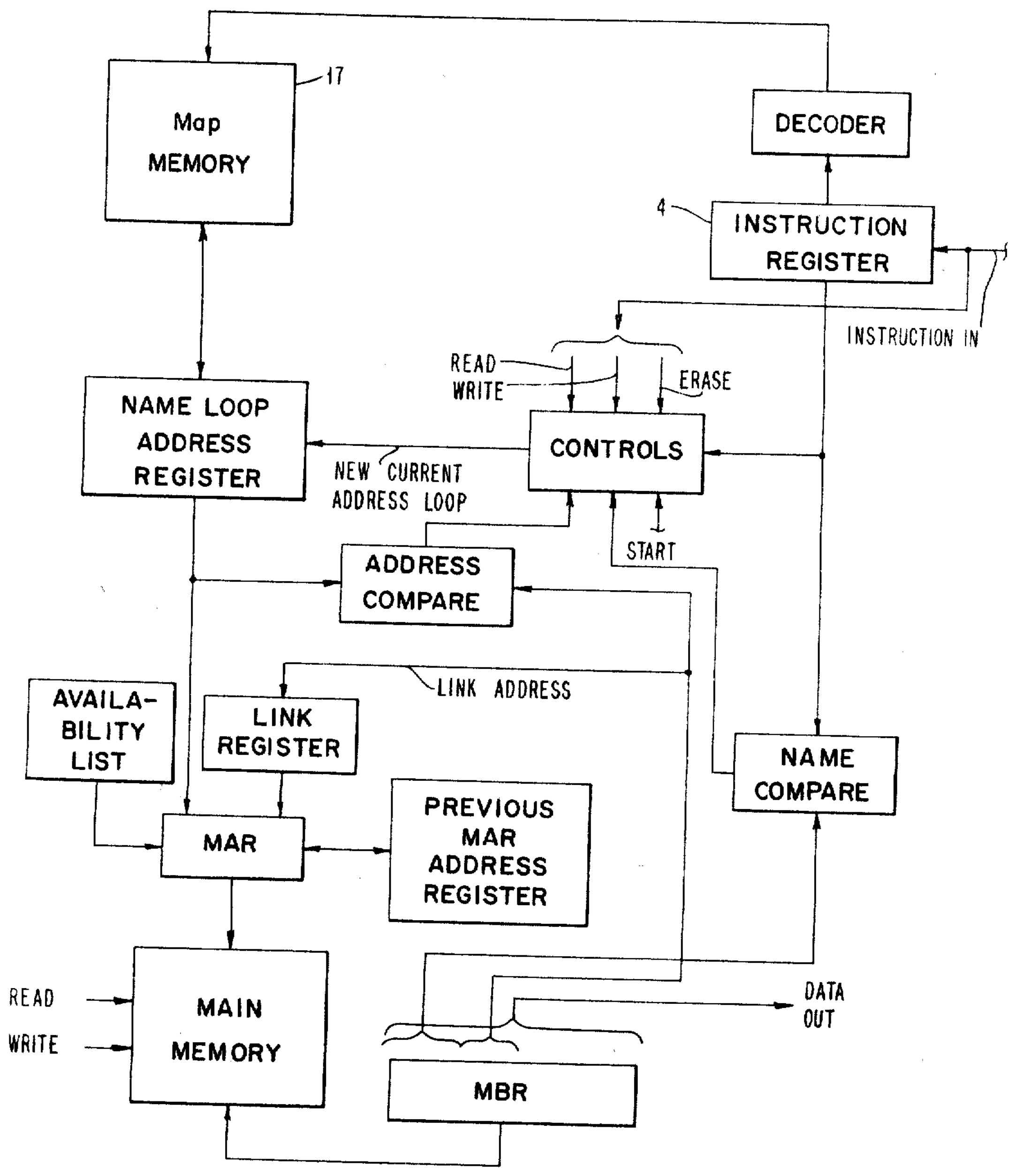
FIGURE 3 is a general functional block diagram of a symbolic addressing system embodying the principles of the present invention.
Figures 4, 4A:
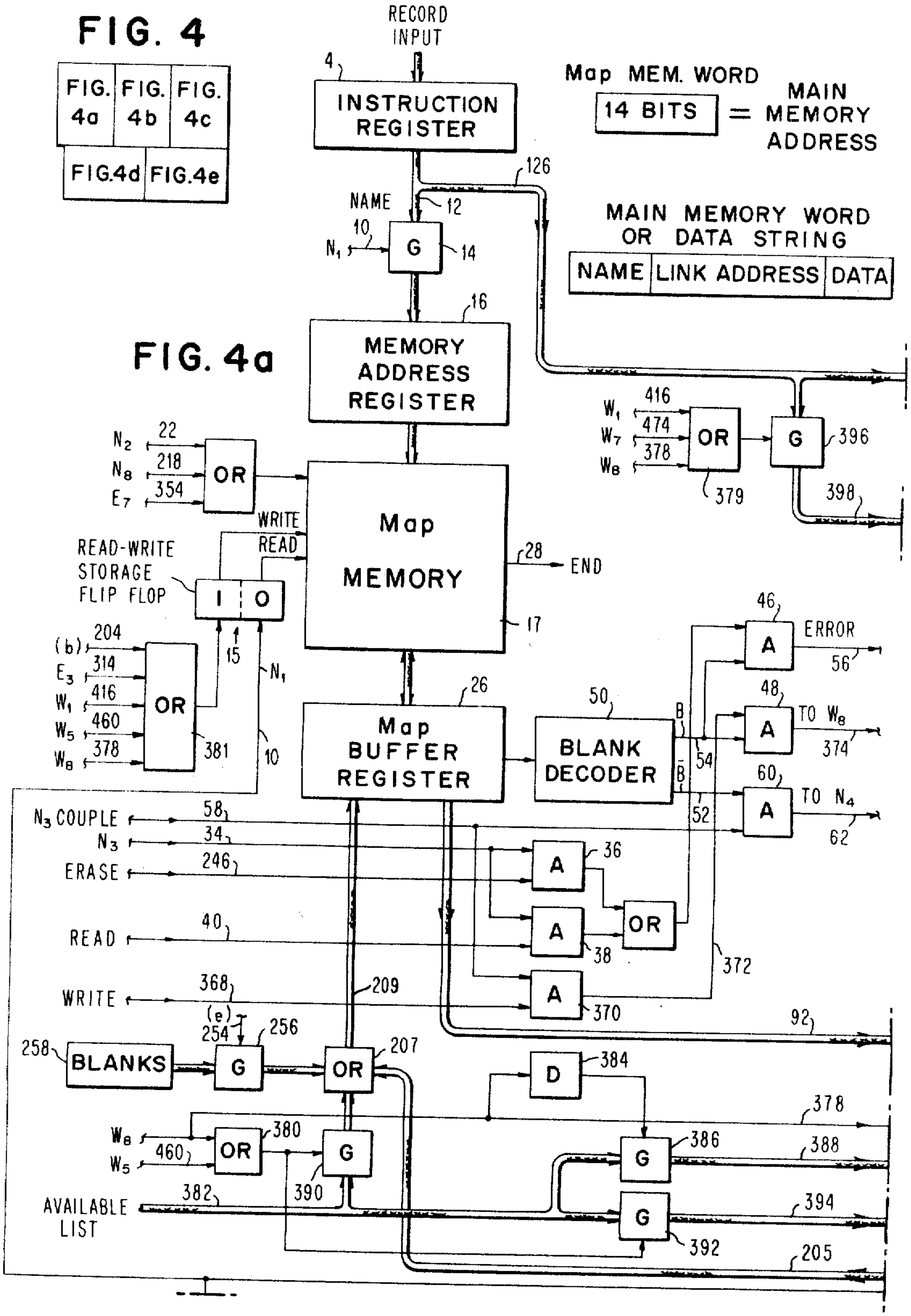
FIGURE 4 is an organizational layout diagram of FIGURES *4a–4e*.
Figure 4B:
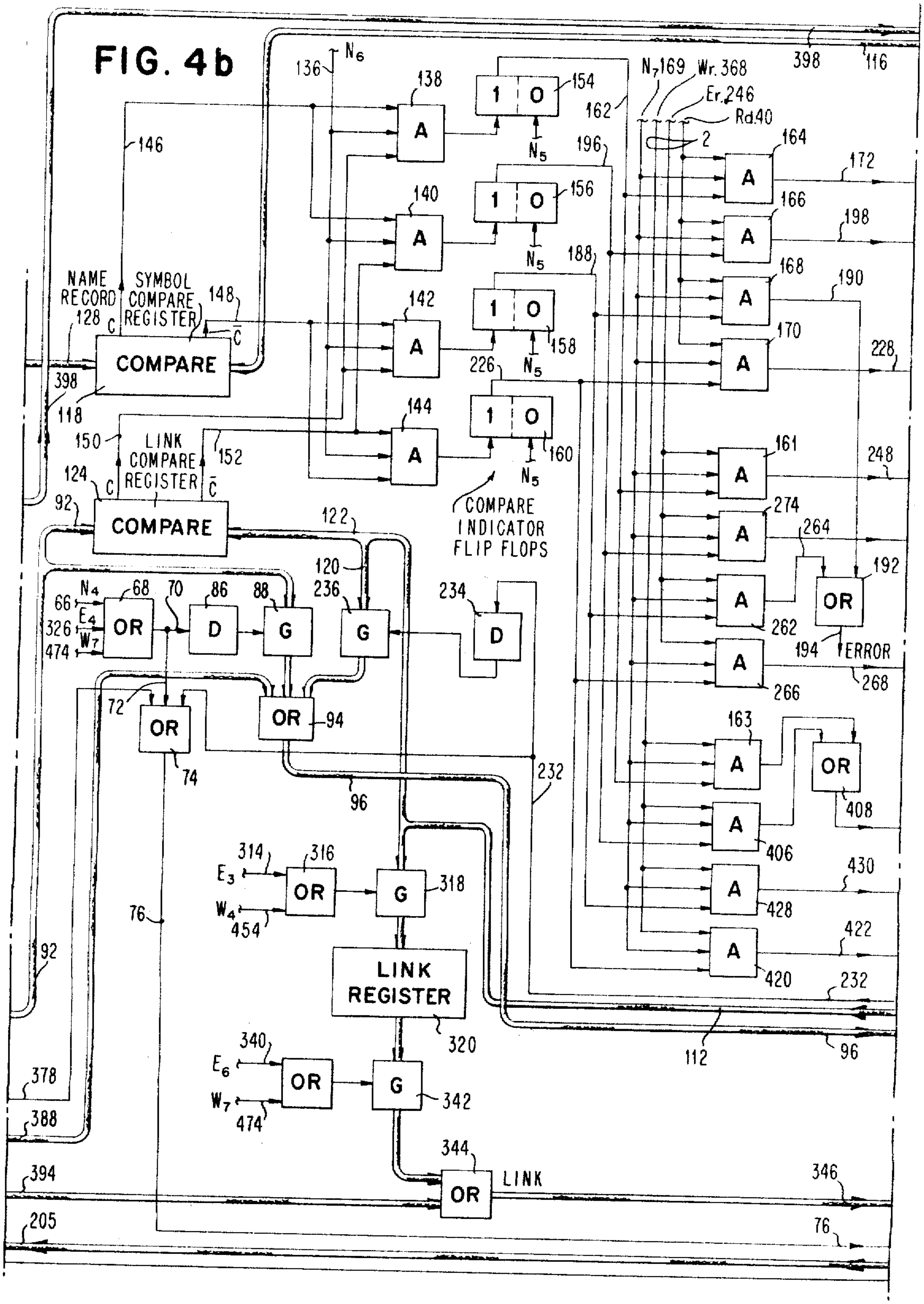
Figure 4C:
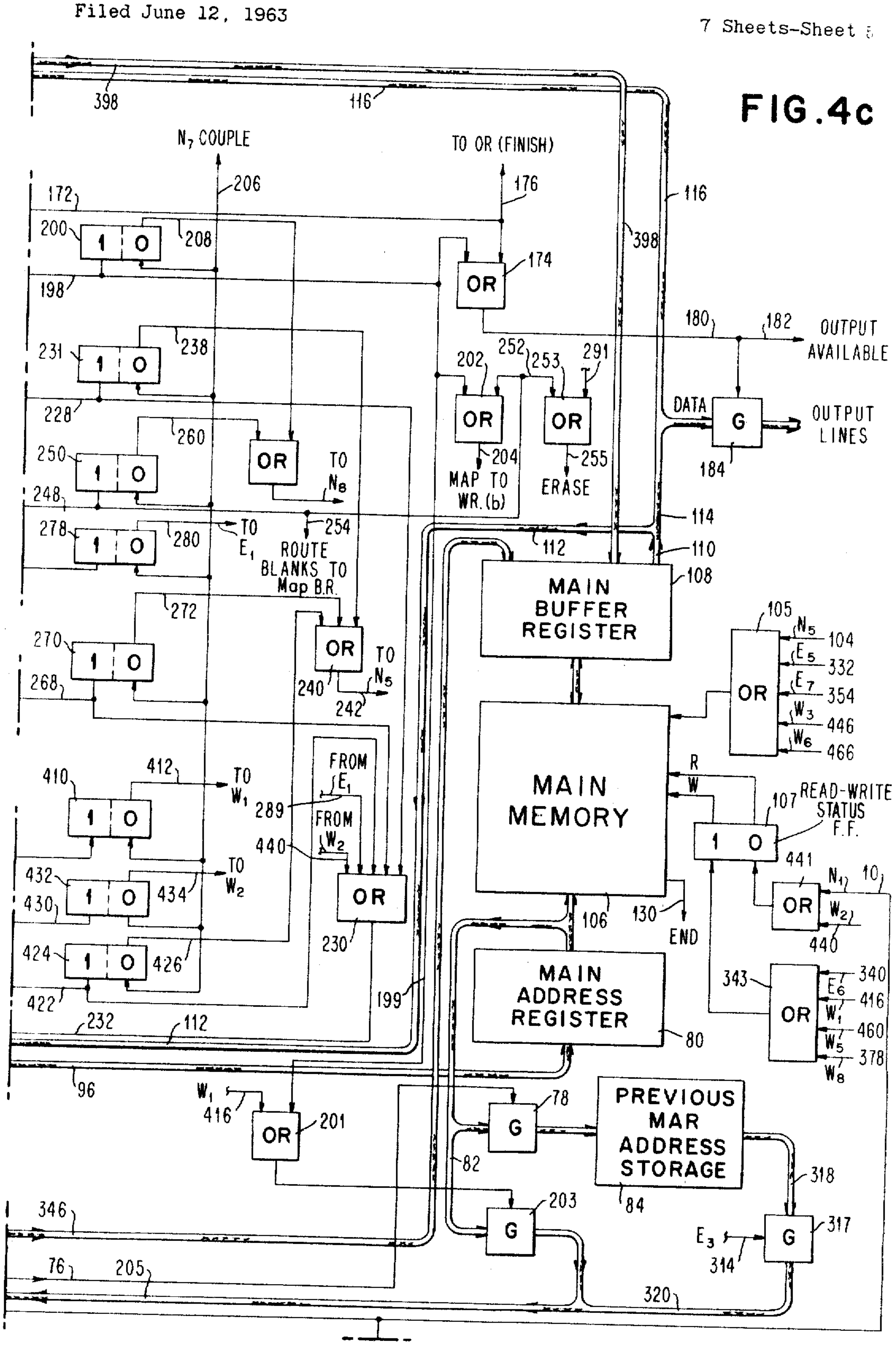
Figure 4D:
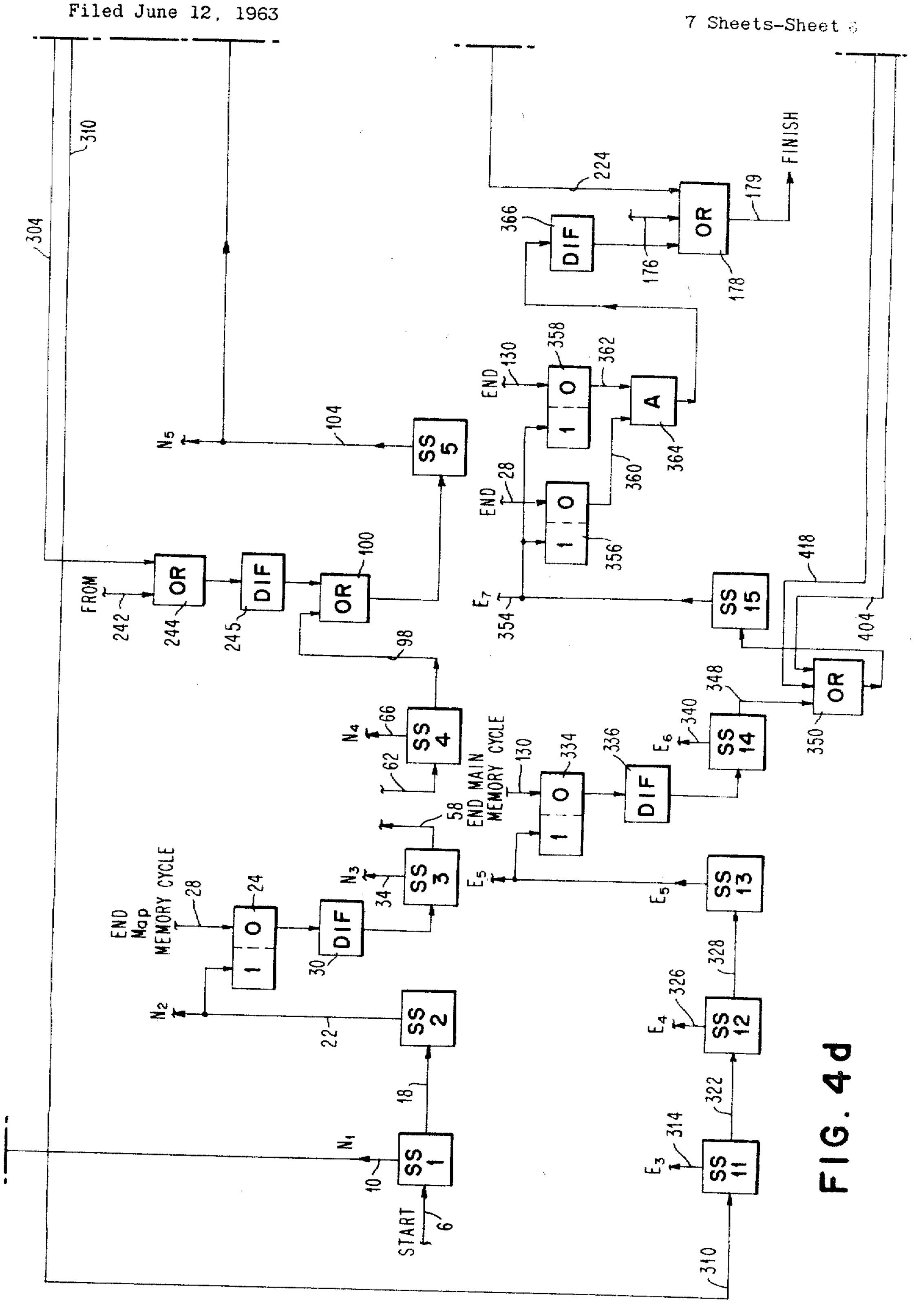
Figure 4E:
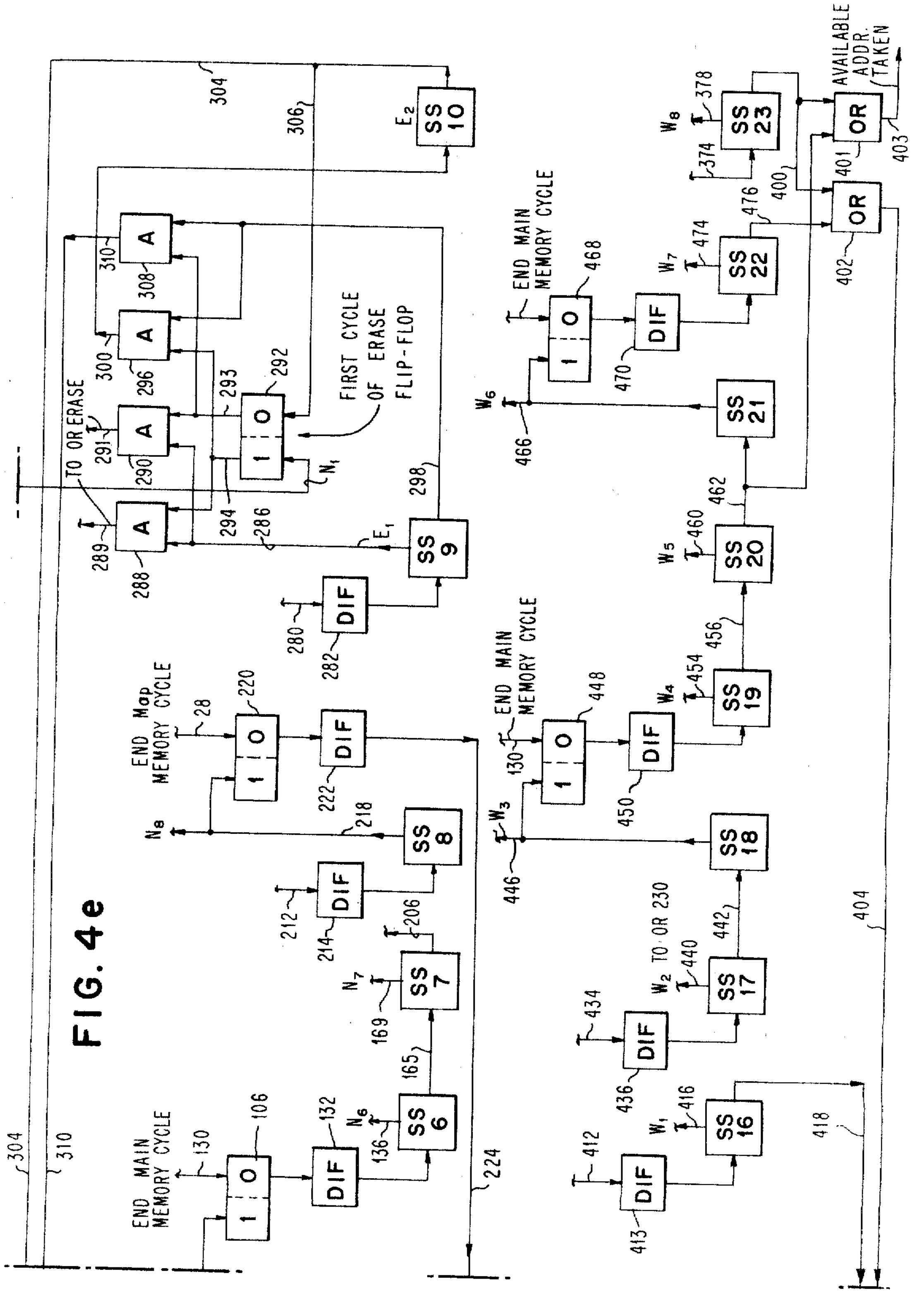

An examplary apparatus embodiment of the present invention is shown in general block diagram form in FIGURE 3. The block designations of this figure are clearly labelled as to their functional purpose in this system. Also, the reference numerals associated with the blocks refer to the more specific detailed showing of FIGURE 4 and these reference numerals indicate which of the more critical functional components of FIGURE 4 are present in the blocks of FIGURE 3.

Before proceeding with the description of FIGURE 3, it should perhaps first be reiterated that the present system is designed to perform three separate functions, namely a "read" operation, a "write" operation and an "erase" operation. The "read" operation will be used whenever it is desired to locate a particular portion of data by a search instruction which gives the Name or symbol of the data. The desired portion of data is located using the present symbolic addressing scheme and when the proper named data is found, a suitable signal will be provided upon an output line that such data is available for read out and such data is made available to external utilization means.

When it is desired to "erase" data from the system, it is, of course, to be understood that such data is assumed to be present in the system. However, testing means are provided for giving an "error" signal whenever an improper "read" or "erase" instruction is given, i.e., when there is no data stored in the system having the Name specified in the instruction. As stated previously in the general description, the "erase" instruction requires that the system be searched to find the particular named portion of data, the linking address for that portion of data extracted therefrom and inserted in the linking position of the previous data string or member of the particular data Name loop. After this replacement of the linkage address has occurred, an "erase" signal may be given to the Main Memory whereby that portion of data will be erased from the memory by well known memory control means.

A "write" instruction may involve any one of three different procedures. In all of these instructions, the system interprets the "write" instruction as saying first look to see if a named data string having the same Name as that placed in the "input" instruction is present in the storage system. If such a named data string is found, it will be re-written with the new data being currently input into the system. If such a named data string is not present in the system, a complete search of the loop will be carried out and the new data inserted at the loop address adjacent the current address or entry point of the loop, as outline above. Lastly, the instruction implies that if there is no existing loop in memory for that particular named data string, a new loop will be set up and the address of that data string which constitutes the first member of said loop inserted in the Map memory and the same address as that in the Map memory will be used for this first member in its linking address storage portion. Thus, the single member is in effect linked to itself.

Referring now to FIGURE 3, this general description of the system will describe the function of the various blocks by going through an instruction in a very general way. In the upper right hand corner, the Instruction Register receives the symbol or Name of the data string which is to be located by the instant symbolic addressing system. This Name is stored in the Input or Instruction Register in binary form together with the data to be stored in the event of a "write" instruction. Concurrently, a signal indicative of whether the operation is to be a "read," "write" or "erase" operation is applied to a suitable line in the block marked "Controls." The first two characters of the Name as mentioned previously are utilized to develop the address in the Map memory corresponding to that for these first two characters of the Name. A suitable address is applied to the Map memory from the decoder and the current loop address is "read" from the Map memory into a Name Loop Address Register. This register is utilized to store the address of the last used item in that particular Name loop.

It should be mentioned at this point that the block marked "Decoder" is a type of unit well known in the computer art and often utilizes a "read only" memory whereby the proper address for the Map memory is derived from the first two characters of the data Name placed in the Instruction Register. It should be noted that the Map memory will normally contain an extremely large number of storage locations, i.e., 4,096, in the presently disclosed and described embodiment and it has been found that this type of a decoding network is the most convenient to use.

A description of such a decoding matrix may be found in "Digital Computer Components and Circuits" by R. K. Richards, D. Van Nostrand Company, Inc., 1957.

Returning again to the operation of the system, the address of the last used or accessed data string for the loop having been stored in the Name Loop Address Register, this address is transferred to the Main Memory Address Register denoted MAR in the figure and the data associated with this address is read out into the Main Memory Buffer Register MBR. At this point, the Name designation of the data string in the Memory Buffer Register is compared with the Name in the Instruction Register in the unit marked "Name Compare." At the same time, the address in the linkage address storage portion of the data string in the Memory Buffer Register is compared with the address stored in the Name Loop Address Register. Assuming (1) that the Names do not compare, which means that the proper data string has not been read out of Main Memory and (2) that the two do not compare, which means that the system has not completed a search of the Name Loop, the linking address in the Main Memory Buffer Register will be transferred to the Main Memory MAR and the next member of the loop will be read out into the Main Memory MBR. This process will be repeated until either a successful Name comparison occurs or until the linking address read out of the particular data string in the Main Memory MBR compares with the address originally read out of the Map memory and stored in the Name Loop Address Register which incidentally is the Memory Buffer Register for the Map memory.

On a "read" cycle, if a Name comparison occurs with or without a linking address comparison, a signal is produced which indicates that the desired data string has been found and this data is presently stored in the Memory Buffer Register of the Main Memory and can be read out upon command. Again, on the "read" cycle, if a successful Name comparison does not occur, and an address comparison does occur to indicate that the entire Name loop has been searched and the named data string has not been found, an "error" signal will be produced by the system which indicates that the looked for piece of data was not stored in memory.

It should also be noted that upon each accessing cycle of Main Memory, the address supplied to the Memory Address Register is automatically gated to the Previous MAR Address Register. The timing sequence at which the previous address is stored in the Previous MAR Address Register is just before a new address is gated into the Main Memory MAR. Thus, on an "erase" or "write" cycle, the linking address for the previous member of a given loop may be readily accessed for storage in a new or inserted member of the loop on a "write" cycle or for re-writing purposes for insertion of the link stored in the link storage position of the word being deleted which has to be inserted in the linked storage position of the just preceding member of the loop so that the deleted member may be skipped on subsequent searches.

During a "write" operation as stated previously, a complete search of a Name loop occurs to make sure that the particular named data string being written into the system has not appeared therein previously or if it has appeared previously, in order that it may be re-written in accordance with the up-dated data being input. In the case of a re-writing instruction or (1) Wherein a data string having the same Name as that being currently input into the system is found, the search procedure is carried out in the same manner as for the "read" instruction outlined previously and when the desired data string is located, the new data string stored in the Instruction Register is automatically written into the Main Memory Buffer Register right on top of the old data as is conventional practice in the art and this new data string is then written into the main Memory saving the Name loop linking address from the old data string.

(2) If upon a "write" instruction no address is stored in the Map memory for that particular Name loop, i.e., blanks stored therein, means are provided for detecting this condition which says that no loop has been created in memory for this particular named data string. In this event, an available storage address is assigned from a block marked "Availability List" which is conventional with any memory system and in the usual case, comprises indexing counters assuming that data is input into the system in sequential storage locations starting at position 0 of both the X and Y axes. This available storage location address is transmitted to the Memory Address Register and the data string is stored in this particular position and since it is the only member of the particular Name loop at the present time, its own address is stored in the linking address portion of the data string itself and also in the proper Map memory storage location in which blanks were previously stored.

(3) The third possible "write" cycle of operation is an insert procedure which is initiated after a complete search of the Name loop has revealed that there is no Name compare in the Name loop and that the loop has been completed by the existence of a signal indicating a successful comparison of the linking address stored in the last accessed member of the loop with the address which was initially read out of the Map memory and is stored in the Name Loop Address Register. In this situation, a storage location address is provided for the data string to be stored again from the block marked "Availability List" and this address is stored in the Memory Address Register. It should be noted in this situation that the new data string is inserted in the loop at a point adjacent to or just succeeding the last used member of the loop whose address appeared in the Map memory. To insert the new member of the loop, the current member of the loop must be read out of Main Memory and stored in the Memory Buffer Register and the linking address of that member must be changed to the address from the Availability List which will be the storage location of the string of data to be inserted. In turn, the linking address formerly in the last used data string must be temporarily held and subsequently stored in the linking address storage location of the new member of the loop.

The following description of the invention with reference to FIGURE 4 will clearly and specifically indicate the functional inter-relationship of the various components of this illustrative embodiment of the invention. All of these functional elements shown in block form are very well known in the computer art, e.g., AND circuits, OR circuits, differentiators (Dif.), registers, compare circuits, flip-flops, single shots, gates etc. Specific illustrative examples of any of these circuits can be found in standard engineering texts. Reference is made to the subsequently cited publications, several of which describe virtually all of the above standard computer functional control units. Since no invention is claimed for any such circuitry and the operation of such circuits is well known, the specific circuit details will not be set forth herein.

The description is effectively broken up into the three possible system operating modes described previously, i.e., "read," "write" and "erase." Each such operation is described in detail and proceeds logically through the system to clearly describe both what instruction is being carried out and just how it is accomplished in terms of functionally related logical circuitry.

Before proceeding with the detailed explanation of FIGURE 4, the following will be a general description of the more important functional blocks of the specific and detailed logical circuitry of the figure.

Referring now to FIGURE 4, it will be noted that this figure actually comprises FIGURES 4*a*, 4*b*, 4*c*, 4*d* and 4*e*; but for convenience in reference, it will simply be referred to as the figure since the five sheets comprise the entire system. In the upper portion of the figure, there is indicated a general format for a Map memory word and a Main Memory word. It will be noted that the Map memory word actually contains the fourteen bits necessary for an X–Y address in the Main Memory as described previously. The Main Memory word or data string is comprised first of the Name or symbol, a link address which will be automatically determined and inserted by the present system and finally the data itself. This will mean as stated previously, that the data format of the Main Memory storage system utilizes eight bit characters. In the present embodiment, there would be provided six character storage locations for the Name although all six may not necessarily be used as in the examples shown in FIGURES 1 and 2 where some of the Names have less than six characters. However, it will be noted that all the Names of the loop contain as their first two characters, MA.

A system instruction is placed in the Input or Instruction Register 4. In the case of a "read" cycle or "erase" cycle, this input would merely be a Name. In the case of a "write" cycle, this would obviously be an entire data string with a blank location provided for storage of the subsequent link address. The specific decoding network is not shown in FIGURE 4. However, it is to be understood that an address into the Map memory is derived from the six characters of the Name by the decoding network and this address is gated to the Map Memory Controls, i.e., MAR 16, on command from Gate Circuit 14. Map Memory 17 contains a current address for each of the various Name loops which are present in the Main Memory. It will be noted that the Map memory has two inputs in the upper left hand portion thereof labelled W and R for "write" and "read" respectively which dictate which operation is to be carried out in the Map memory during a particular portion of the system time cycle. The information is read out of the Map memory and stored in the Map Memory Buffer Register on Map Memory MBR.

The section just described comprises the section of the system which performs the first part of the addressing sequence. In other words, it addresses the Name in the Input Register, determines the proper address in the Map memory and reads out the proper Name loop address which address is stored in the Map MBR 26. Using this address, entry can be made into the desired Name loop and the loop will be searched sequentially in the manner described previously. Blank Decoder 50 serves to analyze the contents of the Map MBR after a "read out" operation to determine whether or not any address was stored in the address portion of the Map memory. If the addressed Map memory word contains blanks, this Decoder will provide an output signal on line 54 which will operate in the system in a manner to be described in the subsequent specific description.

The blank Generation Circuit 258 located below the Map Memory 17 performs the function of inserting binary data in the appropriate portion of the Map memory which will be interpreted as blanks by the decoder when it is desired to "erase" an address in the Map Memory 17.

Compare Circuit 118 performs the function of comparing the Name in the Input Register with the Name read out of the Main Memory and thus determines whether a desired data string has been found in the Name loop.

Compare Circuit 124 compares the address read out of the Main Memory with the linking address in the linking address storage position of each data spring read out of Main Memory and functions to determine when a search of a Name loop has been completed.

Link Register 320 and Previous MAR Address Storage Register 84 form the purpose of temporarily storing various link addresses and Main Memory MAR addresses and function primarily to allow the accessing of previously accessed members of a loop when it is desired to either insert new linking addresses in the loop or to delete address and move addresses from one linking address position of one member of the loop to another address linking address position of another member of the loop when it is desired, for example, to insert data in a loop or to delete data from a loop. This specific sequential operation of these two functional blocks will, of course, be specifically defined in the subsequent and specific description.

Flip-flops 154, 156, 158 and 160 are a group of flip-flops which essentially are set in accordance with the successful or unsuccessful comparisons into Compare Circuits 118 and 124 and as a result of interrogation by Clock Pulse $N_6$. The various other AND circuits, OR circuits and flip-flops of the upper portion of FIGURE 4 are conventional and their respective operation will be apparent from the following specific description of the system.

The Main Memory itself is a quite conventional 3-D word organized memory any word position of which is addressable by means of an X–Y address placed in the Memory Address Register 80. A machine word selected by the Memory Address Register will be automatically read out into the Main Memory Buffer Register 108 in a very conventional manner through the usual sense windings. Writing in this system is likewise accomplished in a conventional manner wherein a proper address where a word is to be stored is fed into the Memory Address Register and the word itself is stored in the Main Memory Buffer Register and upon a "write" indication, this word will be written into the Main Memory. It should be noted that the operation control circuit and so forth of the memory is extremely conventional and the present system could be used with any similar type memory system. It should be further understood that a "read" operation in such a memory of the destructive read out type automatically includes the reading of a word out into the Memory Buffer Register and the subsequent writing of the word back from the Memory Buffer Register. On the "write" cycle, the new word written from the Memory Buffer Register will automatically cancel out any word which might have previously been contained in the storage location assigned as is well understood.

The operation of such 3-D word organized memories is extremely well known in the art and descriptions are available in any one of numerous texts devoted to this subject. The following is a list of typical references to which reference may be had for specific detailed descriptions of the memory itself, the control circuit and the various registers necessary to accomplish the memory organization described. A complete description of such a 3-D memory may be found in the following references: "Digital Computer Components and Circuits" by R. K. Richards, D. Van Nostrand Co., 1957 in the chapter "Magnetic Core Storage" the article "Computer Memories: A Survey of the State of the Art" by A. Rajchman, page 104 of Proceedings of the IRE, January 1961, vol. 49, No. 1; the article "A 32,000-Word Magnetic-Core Memory" by Ross and Partridge, page 102 in the IBM Journal of Research and Development, vol. 1, No. 2, April 1957; the IBM 704 and 705 Customer Engineering Reference Manual; and the IBM Customer Engineering Manual for the 7302 Core Storage Unit.

It should be noted that the clock for the system comprises single shots 1 through 23 (s.s. 1–s.s. 23). It will further be noted that the outputs of these single shots are divided into three groups. Outputs $N_1$–$N_8$ perform what is essentially the "read" portion or operation of the system wherein the Map memory is interrogated and the Name loop entered in Main Memory and the members of each loop are accessed and compared.

Outputs $E_1$–$E_7$ function to perform the "erase" operation of the system and take over after certain portions of the N clock are completed and a desired Name has been found which it is desired to "erase." This clock sequence, i.e., $E_1$–$E_7$, performs the necessary functions of removing a Name from a loop, transferring the linking address from the removed data string, placing it in the linking address storage location of the just succeeding member of the loop so that the continuity of the loop will continue. Again, the specific operating sequence of this portion will likewise be described in detail subsequently.

The outputs of the clock indicated as $W_1$–$W_8$ perform the function of writing a new data string into Main Memory and properly inserting such new member into its proper Name loop. As stated previously, this "write" cycle may take any one of three forms, i.e., where it is the first member of a loop (proper portion of Map memory reveals all blanks) the cycle will form the new Name loop; the cycle will properly insert the new member in an existing data string wherein no member having the same Name is present in the loop, and; lastly, the cycle will automatically write over an old member of the loop having the same Name and preserve the loop linking address of the former named data string.

The following Table I, entitled "Operational Sequence Chart of the Timing Circuitry" clearly defines the operations performed during each time cycle sequence of the System Clock. By carefully proceeding through this chart, together with the drawing of FIGURE 4, the operation of the system may be readily understood. In any event, the specific description of the system which follows will be greatly facilitated by occasional reference to this table.

TABLE I

*Operational sequence chart of the timing circuitry*

Initial conditions:
- Gate instruction into Input Register 4
- Provide "Read," "Write" or "Erase" signal
- Provide "Start" signal to $N_1$ $N_1$—Set Map Memory 17 to "read" status
- Set Map Memory to "read" status
- Set first cycle "erase" F. F. to first cycle status
- Gate I. R. Name to Map M. A. R.
- Go to $N_2$ $N_2$—Read Map Memory
- Go to $N_3$ $N_3$—Check Map Buffer Register (B. R.) for blank TABLE I—*Continued*
- If blank and "read" or "erase" instruction, signal "Error"
- If blank and "write" instruction, go to $W_8$
  - *Note.*—This last step initiates the forming of a new Name loop in memory.
- If not blank, go to $N_4$ $N_4$—Map B. R. to Main M. A. R.
- Go to $N_5$ $N_5$—Read Main Memory
- Reset Compare Indicator F. F.'s 154–160 to 0
- Go to $N_6$ $N_6$—Set Compare Indicator F. F.'s
- Go to $N_7$ $N_7$—Interrogate Compare Indicator F. F.'s
- *Note.*—In the following eleven subsections, the binary indications indicate a "compare" or "no compare" in the Name Compare 118 and in the Link Compare 124 respectively.

(1) If "read" instruction and 1, 1 indication
- (a) Put information on output lines
- (b) Signal "Output Available"
- (c) Signal "Finish"

(2) If "read" instruction and 1, 0 indication
- (a) Gate main M. A. R. address to Map B. R.
- (b) Put information on output lines
- (c) Signal "Output Available"
- (d) Set Map Memory to "write" status
- (e) Go to $N_8$ (3) If "read" instruction and 0, 1 indication
- (a) Signal "Error"

(4) If "read" instruction and 0, 0 indication
- (a) Gate the link address in Main B. R. to Main M. A. R.
- (b) Go to $N_5$ (5) If "erase" instruction and 1, 1 indication
- (a) Gate blanks to Map B. R.
- (b) Set Map Memory to "write" status
- (c) Signal "Erase Main Memory" word
- (d) Go to $N_8$ (6) If "erase" instruction and 1, 0 indication
- (a) Go to $E_1$ (7) If "erase" instruction and 0, 1 indication
- (a) Signal "Error"

(8) If "erase" instruction and 0, 0 indication
- (a) Gate link address in Main B. R. to Main M. A. R.
- (b) Go to $N_5$ (9) If "write" instruction and 1, 1 or 1, 0 indication
- (a) Go to $W_1$

(10) If "write" instruction and 0, 1 indication
- (a) Go to $W_2$

(11) If "write" instruction and 0, 0 indication
- (a) Gate link address in Main B. R. to Main M. A. R.
- (b) Go to $N_5$ $N_8$—Write Map Memory
- Signal "Finish"

$E_1$—(1) If first "erase" cycle
- (a) Gate link address in Main B. R. to Main M. A. R.
- (b) Go to $E_2$ (2) If not first "erase" cycle
- (a) Signal "Erase" Main Memory word
- (b) Go to $E_3$ $E_2$—Set "First Cycle Erase" F. F. to "Not First" cycle
- Go to $N_5$ $E_3$—Gate Previous Main M. A. R. Address to Map. B. R.
- Set Map memory to "write" status
- Gate link address in Main B. R. to Link Register
- Go to $E_4$ $E_4$—Gate Map B. R. to Main M. A. R.
- Go to $E_5$ $E_5$—Read Main Memory
- Go to $E_6$ $E_6$—Gate link register address to Main B. R. link field
- Set Main Memory to "write" status
- Go to $E_7$ TABLE I—*Continued*

$E_7$—Write Map Memory
  Write Main Memory
  Signal "Finish"
$W_1$—Gate I. R. Name and data to Main B. R.
  Set Main Memory to "write" status
  Gate Main M. A. R. Address to Map B. R.
  Set Map Memory to "write" status
  Go to $E_7$
$W_2$—Gate link address in Main B. R. to Main M. A. R.
  Set Main Memory to "read" status
  Go to $W_3$
$W_3$—Read Main Memory
  Go to $W_4$
$W_4$—Gate link address in Main B. R. to Link Register
  Go to $W_5$
$W_5$—Gate address in "Available List" to Map B. R. and link field in Main B. R.
  Set Map Memory to "write" status
  Set Main Memory to "write" status
  Signal "Available Address Taken"
  Go to $W_6$
$W_6$—Write Main Memory
  Go to $W_7$
$W_7$—Gate Map B. R. to Main M. A. R.
  Gate I. R. Name and data to Main B. R.
  Gate Link Register to link field of Main B. R.
  Go to $E_7$
$W_8$—Gate address in "Available List" to Map B. R. link field in Main B. R. and Main M. A. R.
  Gate I. R. Name and data to Main B. R.
  Set Map Memory to "write" status
  Set Main Memory to "write" status
  Signal "Available Address Taken"
  Go to $E_7$ As stated previously, the Map Memory contains 4,096 words of fourteen bits each and the Main Memory contains 16,384 words. The selected word from the Map memory (fourteen bits) is used to address a selected location in the Main Memory.

A standard core type memory is utilized herein which can perform either a "read" or "write" function and which will provide a signal upon completion of the specified function.

To briefly recapitulate the description of a three dimensional word organized memory referred to previously, if the memory is set to "read" status, the informationn stored at selected address will be read into the corresponding Buffer Register during the memory cycle. If the memory is set to "write" status, the information contained in the corresponding Buffer Register will be stored in the selected address of the memory during the memory cycle.

A word of information is assumed to be set into the Input Buffer Register from a source by any conventional means such as cards, paper tape or from part of the memory itself. A signal as to the mode of application (read, erase or write) is supplied to the input lines encircled by 2 from the same source. A start signal on line 6 is similarly supplied from the program source.

Six outputs are available from the present system:

(1) Output information on lines 186
(2) "Output Available" signal on line 182
(3) "Finish" signal on line 179
(4) "Error" signal on line 194
(5) "Erase Main Memory" signal on line 255
(6) "Available Address Taken from Available List" signal on line 403.

*Read Operation*

The following is a detailed description of the symbolic addressing system of the present invention processing a "read" intruction. It is assumed that the data or instruction to be operated upon has been read into the Input Register 4 (shown at upper left corner of the figure). Since this is a "read" instruction, a signal is present from the program source on line 40 of group 2. The group shown as 2 at the top center of FIGURE 4 and at the center left of FIGURE 4 are considered to be connected together. After the information is loaded into the Input Register, a signal is received from an external source on the start line 6, FIGURE 2. This start signal will cause s.s. 1 to provide a signal on line 10. This signal on line 10 is applied to Gate 14, and causes the center six bits of the first two 8 bit characters of the Name in the Input Register to be set into the Memory Address Register 16. These twelve bits provide for the X–Y addressing of any one of the 4,096 words contained in the Map Memory 17. This same signal at $N_1$ time is also supplied to the "read" "write" states flip-flop 15 associated with the Map Memory and will set this flip-flop to the 0 side designating a "read" (R) states. The $N_1$ signal is also applied to flip-flop 107 shown in the lower right hand corner of the figure. This flip-flop is the "read" "write" status flip-flop associated with the Main Memory 106. This will also set the Main Memory to the "read" status. The $N_1$ signal is also applied to flip-flop 292 in the upper right hand section of the figure and sets this flip-flop to the left hand side. This flip-flop will be called the "First Cycle of Erase" flip-flop. Setting it to the left hand side will produce a signal on line 294 which designates that the machine is conditioned for a "First Cycle Erase." This signal is only used if the machine is actually in an "erase" status. Since we are now discussing a "read" status operation, the signal will not be used at the present time. When s.s. 1 (turns off), a signal will be had on the "$N_1$ couple" line 18 which will turn on s.s. 2 and produce the $N_2$ signal on line 22. The operation which will be performed during $N_2$ time is a "read" operation of the Map memory. The $N_2$ signal is applied to cause a Map memory cycle and, since the memory is set to the "read" status, a "read" operation will be performed. This will result in setting the information from the selected position of Map Memory 17 into the Map Buffer Register 26. The signal on line 22 will also set flip-flop 24 in the upper left corner of FIGURE 2 to the left hand side. When the Map memory cycle is completed, a signal on line 28 from the Map Memory 17 will be routed to the right hand side of flip-flop 24. When flip-flop 24 gets set back to the right hand side, a signal will be propagated to the Dif. 30 Circuit which will turn on s.s. 3 and produce an $N_3$ signal on line 34. During $N_3$ time, a check will be made of the Map Buffer Register to see if any Name with the same first two characters has been entered into the system. Since the operation we are describing is a "read" operation, an "error" will be signaled if no Name with the same first two characters has as yet been entered into the system. This will be accomplished as follows. The output of the Map Buffer Register 26 (*in the upper left corner of the figure*) is routed through the Blank Decoder 50. The output of the decoder will be on either line 52 or 54. A signal on line 52 will indicate that the information in the Map Buffer Register is not a blank. A signal on line 54 will indicate that the information in the Map Buffer Register is all blank, i.e., no Main Memory Address stored therein. Line 54 conditions one input to AND circuits 46 and 48. Line 52 conditions one input to AND circuit 60. With a signal on line 40, one input to AND 38 is conditioned. During $N_3$ time, a signal on line 34 will condition the other input to AND 38 and will result in a signal through OR 42 to the other input of AND 46. Therefore, if the Map Buffer Register had contained blanks, an "error" signal will be received on line 56. Also, if the instruction had been an "erase" instruction, a signal on line 246 to AND 36 where it would be combined with the $N_3$ signal on line 34 would result in a signal through OR 42 to AND 46. If the Map Buffer Register had contained blanks, an "error" signal would have been realized. This "error" signal would reflect a programming type error since the operator would have requested either a "read" or an "erase" of information which had not yet been entered into the system. If we assume that the information we wish to read is in the system, then no "error" signal will be received during $N_3$ time. When s.s. 3 turns off an "$N_3$ Couple" signal will be realized on line 58. This signal is routed to AND 60 (in the upper left corner of the figure). If we assume a normal operation, a signal on line 52 signifies that the Map Buffer Register contains information other than blanks and will result in a signal on line 62, the purpose of which is to turn on s.s. 4. This will give us an $N_4$ signal on line 66. During $N_4$ time, the address now contained in the Map Buffer Register will be gated to Main M.A.R. 80. This is accomplished as follows. The $N_4$ signal on line 66 is applied to OR 68 (in the upper left center section of the figure). This will result in a signal on line 72 through OR 74, line 76, to Gate 78. The purpose of Gate 78 during normal operation of the machine is to route the information contained in Main M.A.R. 80, located adjacent to Main Memory 106, into the "Previous M.A.R. Address Storage Register 84." The information contained in "Previous M.A.R." 84 will be fully described in connection with the "erase" operation. The signal from OR 68 is also applied to the Delay Unit 86, via line 70, and, after delay sufficient for the setting of the Main M.A.R. 80 information into the Previous M.A.R. Register 84, will supply a signal to Gate 88. The other input to Gate 88 is the Map Buffer Register information on line 90. This will will be routed through OR 94, lines 96 and into Main M.A.R. 80.

So far, the first two characters of the input name have been used to address a selected portion of Map Memory 17 from which an address has been obtained of a selected portion in the Main Memory 106 and set that information into Main M.A.R. 80.

When s.s. 4 turns off, an $N_4$ Couple signal on line 98 will propagate through OR 100 and turn on s.s. 5. This will result in an $N_5$ signal on line 104. During $N_5$ time, the information in the Main Memory 106 at the selected address will be read into the Main Buffer Register 108. The signal on line 104 will set flip-flop 106 to the 1 side and through OR circiut 105, will cause a Main Memory cycle. OR circuit 105 is shown to the right of Main Memory 106. Upon completion of this memory cycle, a signal on line 130, indicating that the memory cycle is completed, will be routed back to flip-flop 103 and set this flip-flop to the 0 side. This will result in a signal through Dif. 132 to turn on s.s. 6. This will result in an $N_6$ signal on line 136. During $N_6$ time, one of the four compare indicator flip-flops 154, 156, 158 and 160 will be set to the left hand side. Note that all the above mentioned flip-flops were reset to their right hand side during $N_5$ time. The purpose of these four flip-flops is to remember the results of the comparison of two different Name loop search criteria. One of the criterion to be compared is the information in the Name field of the Input Register 4 with the information in the name field of the Main Buffer Register 108. The main field of the Input Register 4 is routed over lines 126 and 128 to the Compare Unit 118. The information in the Name field for the Main Buffer Register 108 is routed over lines 110, 114, and 116 to the Compare Unit 118. The other comparison is made between the address specified by the Map Buffer Register 26 and the information in the link field of the Main Buffer Register 108. If the information in the Map Buffer Register is identical to the information in the link field of the Main Buffer Register, it means that there has been only one entry in the corresponding loop in the Main Memory or for a specific first two characters of a name. If the information in the Name field of the Input Register is idenitcal to the information in the Name field of the Main Buffer Register, it means that the information requested has been addressed in the Main Memory. It will be first assumed that the information requested by the Name in the Input Register has indeed been addressed in the Main Memory. If this is the case, a signal from line 146 of Compare Unit 118 will condition one input to AND's 138 and 140. It will also be assumed that this is the only entry in the Main Memory for this particular loop. A signal from Compare Circuit 124 on line 150 will condition one input to AND's 138 and 142. Now, when the $N_6$ signal on line 136 is applied to AND's 138, 140, 142 and 144 a signal will be realized from AND 138 to set flip-flop 154 to the left hand side. This will produce a signal on line 162 which will condition one input to AND's 164, 161 and 163. When s.s. 6 turns off, a "couple signal" on line 165 will turn on s.s. 7. This will result in an $N_7$ signal on line 169. This signal is supplied at the top center of the figure and will result in a signal from AND 164 on to line 172. This is an indication that the information looked for has been found. This signal is fed through OR 174, line 180, to Gate 184. The other input to Gate 184 is the data from the Main Buffer Register 108. Thus, the data from a selected portion of the Main Memory will be routed to the output lines. The signal on line 180 is also routed on line 182 and used to indicate to the receiving machine that an output is available. The signal on line 172 is routed via line 176 to OR 178, shown adjacent s.s. 7, and will result in a signal on line 179 to signify that the instruction requested is finished. If the information requested by the name in the Input Register has been selected from the loop in the Main Memory, and the loop contains more than one name, an output from Compare Unit 118 on line 146 and from Compare Unit 124 on line 152 will condition two inputs to AND 140. Now, when the $N_6$ signal on line 136 is applied, flip-flop 156 will be set to the left hand side. This will result in a signal on line 196 and, since this is a "read" operation, will result in a signal from AND 166 during $N_7$ time. Since we wish to have the address of the last used position in the corresponding main address position of the Map Memory, we will now route the information from Main M.A.R. 80 to the Map Buffer Register 26 and set the Map memory to a "write" status. Since the information we have addressed in the Main Memory is the information requested; it will be put on the output lines and an "Output Available" signal will be generated.

The routing of the information to the output lines and the generation of the "Output Available" signal is as follows. The signal from AND 166 (at the top of the figure), is routed on line 198 to OR circuit 174, the signal from it performs as previously described. The signal on line 198 is also applied to OR 202 and results in a signal on line 204 which is applied to the left hand side of flip-flop 15 and sets the Map memory to the "write" status. This signal on line 198 also sets flip-flop 200 to the left hand side (upper right center of the figure). When s.s. 7 turns off, the signal on the "couple line" 206 will reset flip-flop 200 back to the right hand side. The output of flip-flop 200 on line 208 is propagated through OR 210 to line 212, Dif. 214 to turn on s.s. 8. This will result in an $N_8$ signal on line 218. The function to be performed during $N_8$ time is to "write" the address of the last used position of the Main Memory 106 into the corresponding location of the Map Memory 17. Therefore, the $N_8$ signal on line 218 is routed to cause a Map memory cycle. This signal on line 218 alseo sets flip-flop 220 adjacent s.s. 8 to the 1 side. When the Map memory cycle is completed, the signal on line 28, from the Map memory, will set flip-flop 220 back to the 0 side and result in a signal through Dif. 222, line 224, OR 178 and out on line 179 to indicate "Finish."

Now assume that the name requested by the Input Register 4 was not found and the address in the Map B.R. 26 is the same as that contained in the link field of the Main Buffer Register. This indicates that a search has been made of the complete Main Memory loop corresponding to the first two letters in the name but that the specific name requested was not found. In other words, we have not yet entered into the Main Memory the information we now wish to read. Clearly this is a programming error. Under the conditions just describe, the signal at $N_6$ time will result in the setting of flip-flop 158 (at the top center of the figure) to the 1 side. During $N_7$ time, an "output" signal from AND 168 on line 190, through OR 192, and out on line 194 will signal "error." Now, it will be assumed that the name in the Input Register is not equal to the name in the Main Buffer Register and that the address in the Map Buffer Register is not equal to the address in the link field of the Main Buffer Register. This means that the location of the Main Memory now being searched for has not been found yet but that there are additional locations in the corresponding loop to be investigated. Therefore, the link address from the Main Buffer Register is routed into the Main M.A.R. 80 and another memory "read" cycle follows. This is done as follows. During $N_6$ time, flip-flop 160, will have been set to the 1 side since a signal from Compare Units 118 and 124 will be present on line 148 and 152 respectively so that the $N_6$ signal on line 136 can pass through AND 144. Now, the $N_7$ signal on line 169 can pass through AND 170 on to line 228 and set flip-flop 231 to the 1 side. This signal on line 228 is also applied to OR 230 and out on line 232, back to OR 74 and delay unit 234. The purpose of the signal from OR 74 has been previously described. The output of delay 234 to Gate 236 results in the routing of the "link address" information from the Main Buffer Register 108 to the OR 94 (in the upper middle section of the figure), out on line 96 and sets Main M.A.R. 80. The $N_7$ couple signal on line 206 will reset flip-flop 231 to the 0 side producing a signal on line 238 through OR 240, line 242, OR 244, Dif. 246, OR 100, to turn on s.s. 5. The purpose of $N_5$ time is to read the Main Memory. This will result in the information at the new address being set into the Main Buffer Register 108 after which time it can be compared with the name in the Input Register and the address specified by the Map Buffer Register.

*Erase operation*

An "erase" instruction (erase signal on line 246 of group 2) will now be described. The first 6 steps in $N_1$, $N_2$, $N_3$, $N_4$, $N_5$, and $N_6$, are identical with those of the "read" operation; however, it is now desired to "erase" the word in the Main Memory, specified by the name in the Input Register, instead of reading it. During $N_6$ time, as previously described, one of the compare indicator flip-flops will be set which will indicate the compare status of the names in conjunction with the compare status of the address in the Map Buffer Register 26 and the address in the link field of the Main Buffer Register 108. It will first be assumed that the correct Name in the Main Memory 106 has been located and that this is the only entry in the Main Memory for this particular loop. Therefore, during $N_6$ time, Flip-flop 158 will be set to the 1 side. A signal is now present on line 246 to condition one input to each of AND's 161, 274, 262, and 266. The signal from Flip-flop 154 will condition the second input to AND 161. The $N_7$ signal on line 169 will result in an output from AND 161 on line 248, set Flip-flop 250 to the 1 side, pass through OR 202 to set the Map Memory 17 to the write status, go to line 252, OR 253, out on line 255, which is an "erase" signal for the Main Memory word and also out on line 254, the purpose of which is to route blanks to the Map Buffer Register. Since this was the only entry in the Main Memory for this particular loop, the routing of the blanks into the Map memory is used to indicate that a loop no longer exists for this Name. The signal on line 254 is routed to the Gate 256 (at the upper left center of the figure). This routes blanks from Unit 258 through OR 207 to the Map Buffer Register 26. When the $N_7$ couple signal is received on line 206, Flip-flop 250 will be set back to the 0 side resulting in a signal on line 260 through OR 210, line 212, Dif. 214, and turn on s.s. 8. As previously described, the action during $N_8$ time is to "write" the information from the Map Buffer Register into the selected position of the Map memory and supply a "Finish" signal on line 179 when the memory cycle is completed. If the Name in the Input Register 4 is the same as the Name in the Main Buffer Register but the address in the Map Buffer Register is different from the address in the link field of the Main Buffer Regiser, Flip-flop 156 will be set to the 1 side during $N_6$ time. This means that the Name requested from the Main Memory has been found but that other Names exist in this particular loop. Since the instruction is to "erase" this particular Name, it is necessary to change the link address in the Name preceding the requested Name in this loop. The $N_7$ signal on line 169 will pass through AND 274 to line 276 and set Flip-flop 278 to the 1 side. The "$N_7$ couple" signal on line 206 will reset Flip-flop 278 back to the 0 side as a result of a signal on line 280 which is fed to Dif. 282, adjacent to s.s. 9, and will turn on s.s. 9. If this is the first $E_1$ signal of "erase," Flip-flop 292 in the 1 state, there is no record available of the address of the previous word in this particular loop. Therefore, it will be necessary to progress around the loop until this Name is again found at which time the address of the previous Name in the loop will be contained at the Previous M.A.R. Register 84. Assume first, that this is the "First Cycle of Erase." The first operation will be to rout the link address contained in the link field of the Main Buffer Register into the Main M.A.R. The signal on line 286, FIGURE 2, $E_1$ conditions one input to AND's 288 and 290 adjacent s.s. 9. Since the "First Cycle Erase" Fip-flop 292, was set to the 1 side during $N_1$ time, the other input to AND 288 is conditioned by the signal on lines 294. The output of AND 288 is routed via line 289 to OR circuit 230, the right center of FIGURE 1. The output of OR 230 sets the current Main M.A.R. address into the "Previous M.A.R." Register 84 and then proceeds to set the link address from the Main Buffer Register into the Main M.A.R. When s.s. 9 turns off, the "couple signal" on line 298 conditions one input of AND's 296 and 308. The other input to AND 296 is conditioned by the signal on line 294 and will result in a signal on line 300 to turn on s.s. 10. When s.s. 10 turns off, a signal on line 306 will set the "First Cycle Erase" Flip-flop 292 to the right hand side. This same signal will route on line 304 to OR 244, Dif. 246, OR 100 and turn on s.s. 5. During $N_5$ time, the Main Memory is read as previously described. Since we are now reading a new portion of the memory, the name in the Input Register will not be equal to the name in the Main Buffer Register and the address in the Map Buffer Register will not be equal to the link field of the Main Buffer Register. The $N_6$ signal following $N_5$ time will now set Flip-flop 160 (the Compare Indicator Flip-Flop) to the 1 side. Now, during $N_7$ time, a signal will be received from AND 266 on line 268 to set Flip-flop 270 to the 1 side. This signal on line 268 will also pass through OR 230, read the Main M.A.R. 80 information into the Previous M.A.R. Register 84 and then set the link address from the Main Buffer Register 100 into the Main M. A. R. 80. This series of cycles are repeated until the name in the Input Register is again equal to the name in the Main Buffer Register. The $N_7$ test will now result in returning back to the $E_1$ cycle as previously described. The different action which will now occur during $E_1$ time is because it is no longer the "First Cycle of Erase." We now have stored in the Previous M.A.R. Register the address of the preceding name in the loop. Flip-flop 292 (First Cycle Erase) is now set to the 0 side. The output of Flip-flop 292 on line 293 is conditioning one input to AND's 290 and 308. The $E_1$ signal on line 286 will now pass through AND 290, out on line 291, to OR 235, (located in the upper right center of the figure). This will produce an "erase" Main Memory signal on line 255. When s.s. 9 times out, the "$E_1$ couple" signal on line 298 will pass through AND 308, line 310, to turn on s.s. 11. Since a word is being deleted from the memory, it is necessary to route the link address associated with that word into the link address field associated with the previous Name of the loop. During $E_3$ time, the address of the previous Name in the loop will be set into the Map Buffer Register 26 and link address from the Main Buffer Register will be set into the Link Register. During this $E_3$ time, the signal on line 314 is applied to Gate 317 (in the right center of the figure). This will route the Previous M.A.R. Address on lines 318 to lines 320, lines 204, OR 207, lines 209, into the Map Buffer Register 26. The $E_3$ signal on line 314 is also applied to OR 316 (center of the figure), to Gates 318. The other input to Gates 318 is the link address from the Main Buffer Register on lines 112. Therefore, this information will be set into the Link Register 320. The signal on line 314 will also be applied to set the "read-write" status Flip-flop 15 of the Map Memory Register to the 1 side. This places the Map Register in the "write" status. When s.s. 11 times out, the "couple signal" one line 322 will turn on s.s. 12. This will produce an $E_4$ signal on line 326. This signal is routed to OR 68, the purpose of which is to read the address from the Map Buffer Register into the Main M.A.R. The name in the loop prior to the one which is to be "erased" is now to be "read" in order to modify the link address of this word. When s.s. 12 times out, the $E_4$ couple signal on line 328 will turn on s.s. 13. This will produce an $E_5$ signal on line 332. During this cycle, the Main Memory will be "read" and the information at the selected address in the Main Buffer Register will be stored. The signal on line 322 is routed through OR 105 to cause a Main Memory cycle. It also sets Flip-flop 344 to the 1 side. At the completion of the memory cycle, and "End Memory" signal on line 130 will set Flip-flop 334 to the 0 side, which produces a signal through Dif. 336 to turn on s.s. 14 The $E_6$ signal on line 304 is routed to OR 341, (center section of the figure) to gate 342. This will route the link address information which is the link information that was contained in the word to be erased from the Link Register 320, through Gates 342, OR's 344, lines 346, into the link address field of the Main Buffer Register. The $E_6$ signal on line 340 is also routed to OR 343 and will set the Main Memory to the "write" status. The new link address is now going to be written into the word position which is the previous position in the loop to the word erased. When s.s. 14 turns off, the couple signal on line 348 through OR 350 will turn on s.s. 15. This will result in an $E_7$ signal on line 354. During this cycle, the address of the new loop starting point will be written into the Map memory and the new link information will be written into the designated word of the Main Memory. The signal on line 354 sets Flip-flops 356 and 358 to the left hand side and also goes to OR 105 and OR 355, the purpose of which is to cause a Map memory and a Main Memory cycle. When the Map memory completes its cycle, the "End Memory" cycle on line 28 will set Flip-flop 356 back to the 0 side. When the Main Memory completes its cycle, the "End Memory" signal on line 130 will set Flip-flop 358 back to the 0 side. It makes no difference which memory completes its cycle first. Upon completion of both memory cycles, the signal from AND 364, through Dif. 366, OR 178, and out on line 179 will signal "Finish."

If the Name in the Input Register does not agree with the name in the Main Buffer Register, but the address in the Map Buffer Register is equal to the link address from the Main Buffer Register, an "error" condition is indicated. This means that the complete loop has been searched and no word has been found to be erased. During $N_6$ time, Flip-flop 158 would have been set to the left hand side. The $N_7$ signal combined with the "erase" signal would result in an output from AND 262, OR 196 and out on line 194 to indicate an "error."

*Write operation*

For a "Write" operation two conditions exist. The writing in of new information into an old address or writing new information into a new address may be specified. First, the writing of information into the Main Memory where no loop exists will be cosidered. This will require getting an available address on the Available List line 382 from a source not shown but described previously and creating a one word loop. The first indication that a loop does not exist will occur at $N_3$ time. The $N_1$ and $N_2$ cycle would be the same as previously described. If a "Write" instruction is being processed, a signal will be present on line 368 group 2. This will condition AND 370 (in the upper left center section of the figure). When s.s. 3 turns off, the signal on line 58 will condition the other input to AND 370 one side of which is conditioned by the "write" signal on line 368 producing a signal on line 372 and condition one input to AND 48. The other input to AND 48 is conditioned by a signal on line 54 which signifies that the Map Buffer Register is filled with blanks. The output of AND 48 on line 374 is routed to turn on s.s. 23, FIGURE 2. This will produce a $W_8$ signal on line 378. Since a new loop is being created, it is necessary to write the beginning address on the loop into the Map Memory, select this address in the Main Memory and insert this address into the link field of the Main Buffer Register. It is also necessary to route the information from the Input Register into the proper field of the Main Buffer Register and set the Map and Main Memory to the "write" status. It is also necessary to provide a signal that an available address has been used. The $W_8$ signal on line 378 is fed to OR 380 (upper left center of the figure) and Delay Unit 384. OR 380 will produce a signal to Gate 390 which will route the available address from line 382 through OR 307, line 209, into the Map Buffer Register 26. OR 380 will also supply a signal to Gate 392 which will route the available address via lines 394, OR 344, lines 346, into the link field of the Main Buffer Register 108. The signal from Delay Unit 384 to Gate 386 will route the available address via lines 388, OR 94 and lines 96, into the Main M.A.R. 80. The $W_8$ signal on line 378 is also supplied through OR 379 to Gate 396 which will route the data from the Input Register to the proper field of the Main Buffer Register 108. The $W_8$ signal is also supplied to OR 378 to set the Map Memory 17 to the "write" status. It is also applied to OR 343 (in the right center portion of the figure) to set the Main Memory 106 to the "write" status. When s.s. 23 turns off, the $W_8$ couple signal on line 400 through OR 401, line 403, will signal that an available address has been used. The signal on line 400 also goes to OR 402, line 404, OR 350 to turn on s.s. 15. This will produce an $E_7$ signal, the action of which has been previously described. The above described operation in connection with a "write" instruction will occur if the Map word selected by the Name in the Input Register contained all blanks. If the address in the Map Buffer Register was other than blanks, the $N_3$ couple instruction on line 58 (in the upper left hand corner of the figure) would have produced a signal through AND 60 to turn on s.s. 4. The operation during $N_4$, $N_5$, and $N_6$ would have been as previously described. In a "write" operation, the signal on line 368 (at the top center of the figure) will condition one input to AND's 163, 406, 420 and 428. If the Name in the Input Register is the same as the name in the Main Buffer Register and the address in the Map Buffer Register is the same as the link address in the Main Buffer Register, the $N_7$ signal on line 169 will go through AND 163, OR 408, to set Flip-flop 410 to the 1 side. If the Name in the Input Register is equal to the Name in the Main Buffer Register, but the address in the Map Buffer Register is different from the link address in the Main Buffer Register, the $N_7$ signal on line 169 will go through AND 406, OR 408, to set Flip-flop 310 to the 1 side. In other words, if the selected word in the Main Memory is the one requested by the Name in the Input Register Flip-flop 410 will be set to the left hand side by the $N_7$ signal. When s.s. 7 turns off, the "$N_7$ couple" signal on line 206 will set Flip-flop 410 back to the 0 side. This will produce a signal on line 412 to Dif. 413 (adjacent s.s. 16) and turn on s.s. 16. The $W_1$ signal on line 416 will route the contents of Input Register, i.e., whole data string to the Main Buffer Register, set the Main Memory to the "write" status, route the address from the Main M.A.R. 80 to the Map Buffer Register 26, and set the Map Memory to the "write" status. The $W_1$ signal on line 416 is routed to OR 379 (at the center of figure), to Gates 396 and will set the data from the Input Register 4 into the Main Buffer Register 108. This same $W_1$ signal one line 416 is also fed to OR 343 (in the right center portion of the figure) to set the Main Memory 106 to the "write" status. This signal is also routed to OR 201 (in the right center portion of the figure), to Gate 203 which will route the Main M.A.R. address from lines 82 to lines 205, OR's 207, lines 209, to the Map Buffer Register. It is also supplied to OR 381 (upper left hand corner of the figure) to set the Map memory to the "write" status. When s.s. 16 turns off, the "$W_1$ couple" signal on line 448 through OR 350, will turn on s.s. 15. This will supply the $E_7$ signal the actions of which have been previously described.

If a "write" instruction, and the Name in the Input Register does not agree with the Name in the Main Buffer Register and the address in the Map Buffer Register 26 does not agree with the link address in the Main Buffer Register 108, Compare Indicator Flip-flop 160 will be set during $N_6$ time. The $N_7$ signal on line 169 through AND 420 will set line 422, will set Flip-flop 424 to the left hand side. The signal on line 422 will also go through OR 230, the action of which has been previously described. When s.s. 7 turns off, the $N_7$ couple signal on line 206 will set Flip-flop 424 back to the 0 side. This will result in a signal on line 426, OR 240, line 242, OR 244, (adjacent s.s. 5), Dif. 246, OR 100, to turn on s.s. 5. The purpose of going back to s.s. 5 is to continue the search for the proper word.

It will be assumed now that the Name in the Input Register is not equal to the Name in the Main Buffer Register but the address in the Map Buffer Register is equal to the address in the link field in the Main Buffer Register. This means that the complete loop in the Main Memory associated with the Name in the Input Register has been searched and that the Name, at present, does not exist in the Main Memory. It is now necessary to insert the new Name and record into the existing loop. This new Name will be inserted into the loop immediately following the Name selected by the address in the Map Buffer Register or the current address for the loop. This will require changing the link address in the word specified by the address in the Map Buffer Register to the address from the "Available List." It will also require placing the link address from the word specified by the Map Buffer Register 26 into the link field of the newly inserted word. During $N_6$ time, Flip-flop 158 will be set to the 1 side (top center of the figure) since one of the inputs to AND 142 will be conditioned by the "not compare" signal on line 148 from Compare Unit 118. The other input to AND 142 will be conditioned by a "compare" signal on line 150 of Compare Unit 124. The $N_7$ signal on line 169 will go through AND 428, line 430, reset Flip-flop 432 to the left hand side. When s.s. 7 turns off, the couple signal on line 206 will set Flip-flop 432 back to the right hand side. This will produce a signal on line 434 to Dif. 436 to turn on s.s. 17.

The $W_2$ signal on line 440 goes to OR 230, the purposes of which has been previously described. The $W_2$ signal on line 440 also goes to OR 441, to reset the Main Memory to the "read" status. When s.s. 17 turns off, the signal on line 442 will turn on s.s. 18. This will result in a $W_3$ signal on line 446. Line 446 goes to OR 105, adjacent the Main Memory and will result in a "read" memory cycle. The $W_3$ signal, line 446, will also set Flip-flop 448 (adjacent to s.s. 19) to the 1 side. When the Main Memory cycle is completed, the signal on line 130 from the Main Memory will set Flip-flop 448 back to the right hand side. This will result in a signal Dif. 450 to turn on s.s. 19. The information in the Main Buffer Register 108 has now been obtained from the address selected by the Map Buffer Register 26. It is now necessary to change the link address in this position or old member of the loop to the address otbained from the "Available List." The $W_4$ signal on line 454 is applied to OR 316 (adjacent Link Register 320) to Gate 318 and will route the link information from this selected position into the Link Register 320. It is necessary to save this link address so that it can be inserted into the link field of the portion of memory selected for the entry of the new word. When s.s. 19 turns off, the signal on line 456 will turn on s.s. 20. The $W_5$ signal on line 460 will first be used to set the address from the "Available List" into the Map Buffer Register 26 and into the link field of the Main Buffer Register 108. It will be written into the Map Buffer Register so that this new word inserted into the Main Memory will be interrogated first when the next Name with the same first two characters is called for by the Input Register. In other words, the new word will be the current member whose address is stored in Map memory 17. This new available address has been inserted itno the link field of the Main Buffer Register so as to provide a linkage from the existing loop to this new name to be inserted. The $W_5$ signal on line 460 is also routed to OR 381 (adjacent to the Map memory) to set the Map memory to the "write" status. It is also routed to OR 343 (adjacent to the Main Memory) to set the Main Memory to the "write" status. When s.s. 20 turns off, the couple signal on line 462 is routed through OR 201 to line 403 to signal that an available address has been taken. This signal on line 462 will also turn on s.s. 21. The $W_6$ signal on line 466 is routed to OR 105 (adjacent to Main Memory), to cause a Main Memory cycle. Flip-flop 468, (adjacent to s.s. 22) is set to the 1 side by this $W_6$ signal. When the "End of Memory" signal from the Main Memory is received on line 130, Flip-flop 468 will be set to the 0 side. This will produce a signal through Dif. 470 to turn on s.s. 20. This will produce a $W_7$ signal on line 474. During $W_7$ time, the writing of the address of the new word into the Map memory will be provided for the writing of the Input Register information into the Main Memory and also the writing of the link information obtained from the previous word of the loop into the new word of the loop. The $W_7$ signal on line 474 is routed to OR 379 (at the center of the figure) which will condition Gate 396 to route the data from the Input Register to the Main Buffer Register. The $W_7$ signal on line 474 is also routed to OR 68, (upper left center section of the figure) the action of which has been previously described. This $W_7$ signal is also routed to OR 341, (the center section of the figure) and will result in the routing of the Link Register information to the link address field of the Main Buffer Register. When s.s. 22 turns off, the couple signal on line 476 through OR 402, wire 404, OR 350, will turn on s.s. 15. This will produce an $E_7$ signal, the action of which has been previously described.

The previous detailed description of FIGURE 4 completely describes the operation of the presently disclosed embodiment of the invention. All of the control circuitry necessary to effect "read," "write" and "erase" instructions in such a "Symbolically Addressed" system have been set forth. However, it should be understood that this embodiment is only intended to be exemplary in nature. For example, the specific logical control circuitry, the various registers and the timing circuits illustrate but one method of accomplishing the symbolic addressing concept of the present invention. While the presently disclosed embodiment is substantially synchronous in nature in that the specific clock sequences necessary to a given mode of operation have to be completed before a new cycle may be initiated, it is apparent that the system could be designed to run asynchronously as well. Likewise, fewer registers and compare circuits could be used if it were desired to replace them with more complicated control circuitry capable of shifting the various segments of data around more often. It is believed, however, that the present embodiment represents an extremely clear and concise description of the invention and readily allows an appreciation of the system concepts and is presented in as clear a manner as possible.

As stated previously, the various circuit design configuration of the logical and functional blocks disclosed are of little consequence as all of the individual circuits are well known in the art. The invention in the present system resides in the manner in which the various well known circuits are interconnected to produce the symbolically organized and addressable storage system disclosed. As is the case with all such systems, the necessary circuitry could equally well be embodied from vacuum tube circuits, transistor circuits, or even superconductor circuitry. As stated previously, the types of functions performed by the various logical functional blocks disclosed in the embodiment of FIGURE 4 are well known and circuits performing these functions are clearly disclosed and described in any number of widely available engineering texts, such as the ones set forth previously.

Although standard magnetic core word organized memories have been utilized in the present embodiment, other types of memories could be substituted therefor. For example, William's Tube or electrostatic type storage devices, cryogenic memories and other types of the more modern magnetic memories, such as thick and thin film memories could be used.

The invention has also been set forth and described so that the symbol or Name characteristic of each data string is associated with only one rather long machine word, each such machine word representing a separate data string and having a separate Name. However, it should be understood that it would be equally possible to have one such symbol or Name refer to a plurality of contiguous machine words forming a longer data string. The various control circuitry for finding the extent of such machine words would, of course, have to be added to the present system, but would be within the knowledge of a person skilled in the art. The use of the present system with such a multiple machine word data string storage organization would not basically affect the present system organization, the only difference would be that when a "write" or "erase" operation were necessary, the memory control circuitry would have to be able to determine the extent of the data string for both "writing" and "reading" operations as well as "erasing" operations. The actual storing of a Name or symbol as well as the linking address in a particular Name loop would not in any way be changed.

The instant embodiment discloses circuitry for inserting a new member of a Name loop at a position just after the current member. However, it should be noted that additional control circuitry could be provided to insert the new member in some other spot, e.g., alphabetically, after the initial loop search to establish that no data string of the same symbolic Name presently exists in the memory.

Similarly, it is not necessary that a search of a Name loop proceed in a fixed sequential order. If suitable linking of the loop is provided, the search could proceed in the order, for example, of first, the Name last used, next the Name preceding this last used Name, next the Name succeeding the Name last used, etc. Thus, the search could be performed in any way which provided statistically the least number of comparisons.

It should be further understood that the bit combination which determines the address of the special location at which it stores the address of the appropriate loop need not be derived from only the first two characters of the Name in question. It could be derived, for example, by some other addressing scheme which would better distribute the resulting address rather than one based strictly on alphabetic groupings. Thus name groups would result which were totally unrelated to their alpha character groupings.

Having thus described the present invention, it will be apparent that it represents a valuable tool in the computer arts. Some storage space must, of course, be utilized for both the storage of the unique Name or symbol for a given string of data together with the Name loop linking addresses and additional control circuitry and the Map memory and Decoder must be supplied. Still, the amount of extra hardware required for the present system is only a fraction of that required for standard associative memories. The result of the present system is that the programming concept of an associative memory system is essentially embodied with far less apparatus. In other words, the only instruction necessary to find a given data string is to merely use its characteristic symbol and input this Name into the system which will automatically locate the named data string if it is, in fact, located in the system.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A symbolic addressing system for use with a computer data storage organization including a Main Memory means for storing a plurality of data strings wherein each string is separately addressable by the memory and each string is provided with a discrete symbolic Name said Name being stored with said data string in Main Memory at a predetermined position with respect to the beginning address of said data string and wherein a special address storage location is provided in each data string for storing a complete memory address in predetermined relationship to said Name, the improvement which comprises a first and second table of addresses, said first table comprising an auxiliary storage means the absolute address to which is directly derived from a characteristic portion of the symbolic data Name, said table containing at least one of one member of each of a plurality address of groups of linked data strings in the Main Memory each member of a given group having the same characteristic Name portions as that utilized to determine the address in the first table, means for accessing said first table means at an address directly relatable to a requested Name, means extending an address stored in said first table which provides for a proper entry point in Main Memory for a second level of searching through a proper Name group, said second table means comprising the combination of said linked data strings of individual Name groups which strings include the linking addresses stored with each data string connecting all of the members of a Name group together means for entering a given Name group beginning at the address of the data string stored in said first table means, means for extracting the address of the next member of said name group and, means for continuing a search of successive data strings of said name group until a specified Name is located in one of said data strings.

2. A symbolic addressing system for use with a computer data storage organization as set forth in claim 1 wherein each data string may occupy any desired number of machine words and including means to indicate the beginning address of each machine word from which the name of such data string may be readily read out together with the linking address stored at said predetermined positions with respect to said symbolic names.

3. In a computer data storage system including Main Memory means for storing a plurality of data strings wherein each string is separately addressable by the memory and wherein each string is provided with a different symbolic Name, said Name being stored with the data string at a predetermined position with respect to the beginning address of said data string and wherein a special linking address storage location is provided in each data string for storing a complete memory address in predetermined relationship to said Name, the improvement which comprises means for examining a preselected portion of each symbolic Name of a data string to be stored in the storage system, means for grouping all of said data string whose preselected Name portions are the same in linked Name groups in memory, auxiliary storage means for storing the address of one member of each such Name group, means including said auxiliary storage means for automatically obtaining an address into the proper group in Main Memory in accordance with a system Name instruction having the common group Name characteristic, and means for searching through a linked Name group for the specific Name instruction.

4. A computer data storage system as set forth in claim 3 including means for linking the members of each Name group which comprises means for storing the Main Memory address of a subsequent member of a group in a special address storage location of a preceding member of the group.

5. A computer data storage system as set forth in claim 4 wherein means are provided for automatically storing the address in said auxiliary means of the most recent member of a Name group to be accessed.

6. A computer data storage system as set forth in claim 4 wherein means are provided for detecting the output of said auxiliary storage means for determining when no Name group exists in Main Memory for a given Name instruction and for determining when no specific compare exists in a given Name group for said Name instruction.

7. A computer data storage system as set forth in claim 6 wherein means are provided for storing a new named data string in an existing Name group in Main Memory or for starting a new Name group in accordance with the particular Name of the data string being inserted.

8. A computer data storage system as set forth in claim 7 including means for deleting a named data string from memory and from an appropriate Name group including means for automatically extracting the Name loop linking address from the data string being deleted and inserting that linking address in the special storage location of the previous member of the group to replace the group linking address in Main Memory stored therein of the member being deleted.

9. A symbolic addressing system for use in a computer data storage organization including Main Memory means for storing a plurality of data string wherein each string is separately addressable by the memory and wherein each string is provided with a different symbolic Name, said Name being stored with the data string at a predetermined position with respect to the beginning address of said data string and wherein a special address storage location is provided in each data string for storing a complete memory address in predetermined relationship to said Name, the improvement which comprises;

means for examining a preselected portion of each symbolic Name in a string of data to be stored in the storage system, means for grouping all of said data strings whose preselected Name portions are the same in linked groups in memory utilizing said special address storage locations in each data string and further for closing the Name groups to form Name loops by storing the address of the first member of the group in the special address storage location of the last member of the group, auxiliary means for storing the address of the last member of each such Name loop to be accessed, means for automatically obtaining an address into the proper Name loop in Main Memory from said auxiliary memory in accordance with a Name instruction having the common Name loop characteristic, means for searching through a linked Name loop for a specifically named data string, wherein the said system may be given a "read," "write" or "erase" operation instruction each such instruction including at least the Name of the data string and a signal indicative of the mode of operation and wherein means are included to perform a search of memory to locate the name indicated by any such instruction.

10. A symbolic addressing system for use with a computer data storage organization as set forth in claim 9 wherein register means are provided for temporarily storing the address in Main Memory of the last accessed data string of a Name loop during a search of said loop whereby when a search is proceeding through a Name loop the address of the previous member is stored while a newly accessed member is being processed.

11. A symbolic addressing system for use with a computer data storage organization as set forth in claim 10 wherein said means for linking said Name loop includes means for storing the address in Main Memory of at least one other member of the Name loop in every member and wherein no two members in the same Name loop contain the same linking address.

12. A symbolic addressing system for use with a computer data storage organization as set forth in claim 11 wherein said means for linking said Name loops includes means for automatically storing in each member of the loop the address in Main Memory of the succeeding and preceding member of the loop and wherein the relative storage position of each such address is the same in each member.

13. A symbolic addressing system for use with a computer data storage organization as set forth in claim 11 including means for automatically searching through an entire Name loop for a given name until found or for indicating that such Name is not present in the memory.

14. A symbolic addressing system for use with a computer data storage organization as set forth in claim 13 wherein said search means includes means for accessing at least the Name and linking address of each member of the Name loop as the search through the loop progresses.

15. A symbolic addressing system for use with a computer data storage system as set forth in claim 14 wherein said last Name means includes address storage and comparison means which indicates when the address of a member of a Name loop to be addressed is the same as the address at which the search within the loop was initiated.

16. A symbolic addressing system for use with a computer storage system as set forth in claim 15 above including means for indicating that a given Name loop does not exist in Main Memory.

17. A symbolic addressing system for a computer data storage system as set forth in claim 16 wherein said last named means includes means for storing all blanks in said auxiliary memory means when a given named loop address does not exist in Main Memory and means for detecting stored blanks when said section of the auxilitary memory is accessed.

18. A symbolic addressing system for use with a computer data storage organization as set forth in claim 17 wherein the absence of the named data string in memory actuates means for providing an "error" indication during a "read" or "erase" operation.

19. A symbolic addressing system for use with a computer data storage organization as set forth in claim 18 wherein means are provided for automatically forming a new Name loop for a named data string upon a "write" instruction if no named loop exists in the memory.

20. A symbolic addressing system for use with a computer data storage organization as set forth in claim 19 wherein the occurrence of a blank indication in the auxiliary memory together with a "write" instruction actuates means to store the address of the storage location in Main Memory of the new data string in the appropriate portion of the auxiliary memory means and also for storing the same address in the special address storage location provided with the data string.

21. A symbolic addressing system for use with a computer data storage organization as set forth in claim 20 wherein means are provided for automatically inserting a new named data string in an appropriate existing Name loop upon a "write" instruction.

22. A symbolic addressing system for use with a computer data storage organization as set forth in claim 21 including means for obtaining a storage location in Main Memory for said new data string to be written into the system and for storing said data string in Main Memory at this location and for storing the address in the proper linking address storage location of the just preceding member of the Name loop.

23. A symbolic addressing system for use with a computer data storage organization as set forth in claim 22 wherein said last named means includes means for detecting when a searth of the Name loop has failed to locate a member of said loop having the same Name, means for inserting said new member in a linked position in said loop succeeding the previous entry point into the loop and means for storing the address of the new member in the auxiliary storage means and wherein said means for inserting includes means for storing the address of the new member of the loop in the special address storage location of the previously accessed member of the loop and for transferring the address previously stored with said previously accessed member to the special address location of the new member of the loop.

24. A symbolic addressing system for use with a computer data storage organization as set forth in claim 23 wherein means are provided upon a "write" instruction for detecting when a Name loop exists for a particular Name data string and when the same Name already exists in the Name loop and means responsive to the occurrence of such conditions for writing the new data string in memory at the same location as the old data string having the same Name and means for preserving the linking address stored in the special address storage location of the old data string in the new data string.

25. A symbolic addressing system for use with a computer data storage organization as set forth in claim 24 wherein means are provided for comparing the Name of each newly accessed data string from Main Memory with the Name included with every system instruction, said means including a compare register means adapted to receive both Names and operative to produce separate signals whether a newly accessed Name does or does not compare with the instruction Name.

26. A symbolic addressing system for use with a computer data storage organization as set forth in claim 25 wherein means are provided for comparing the address of each newly accessed data string from Main Memory with the address stored in the auxiliary memory as the entry point of the Name loop said means including compare register means adapted to receive both addresses as a search through a loop progresses and operative to indicate a comparison of said addresses whereby it may be determined when a search of the given Name loop has been completed.

References Cited

UNITED STATES PATENTS 3,107,343 10/1963 Poole ------------ 340—172.5

ROBERT C. BAILEY, *Primary Examiner.*

G. D. SHAW, *Assistant Examiner.*